United States Patent [19]

Rounds

[11] Patent Number: 4,878,150
[45] Date of Patent: Oct. 31, 1989

[54] POLARIZABLE MATERIAL HAVING A LIQUID CRYSTAL MICROSTRUCTURE AND ELECTRICAL COMPONENTS PRODUCED THEREFROM

[75] Inventor: Rhyta S. Rounds, Flemington, N.J.

[73] Assignee: Colgate-Palmolive Co., Piscataway, N.J.

[21] Appl. No.: 17,424

[22] Filed: Feb. 20, 1987

[51] Int. Cl.⁴ .................. H01G 4/06; H01G 4/08; H01G 9/00

[52] U.S. Cl. .................. 361/311; 252/62.2; 361/323; 361/504

[58] Field of Search .......... 361/433, 323, 311–315; 350/350 S; 252/62.2

[56] References Cited

U.S. PATENT DOCUMENTS

| | | | |
|---|---|---|---|
| 1,576,096 | 3/1926 | Davey | 361/315 X |
| 1,804,364 | 5/1931 | Parker | 361/311 X |
| 1,829,178 | 10/1931 | Yngve | 361/433 X |
| 1,886,235 | 1/1932 | Meissner | 361/311 X |
| 1,951,720 | 3/1934 | Bergstein | 361/433 |
| 1,952,158 | 3/1934 | Clark et al. | 361/311 X |
| 1,997,263 | 4/1935 | Meissner | 204/31 |
| 2,024,705 | 12/1935 | Rutherford | 179/106 |
| 2,145,710 | 1/1939 | Clark | 361/433 E |
| 2,190,592 | 2/1940 | Clayton | 87/16 |
| 2,284,039 | 5/1942 | Bruno | 179/111 |
| 2,336,893 | 12/1943 | Scott | 260/418 |
| 2,460,109 | 1/1949 | Southworth | 179/171.5 |
| 2,482,086 | 9/1949 | Foster et al. | 361/323 X |
| 2,926,792 | 12/1959 | Crook et al. | 25/8 |
| 2,986,524 | 1/1949 | Padgett | 252/63.2 |
| 3,296,829 | 1/1967 | Williams | 64/15 |
| 3,458,713 | 7/1969 | Perlman et al. | 307/88 |
| 3,538,394 | 11/1970 | Bourgault et al. | 361/433 |
| 3,652,902 | 3/1972 | Hart et al. | 361/433 |
| 3,700,975 | 10/1972 | Butherus et al. | 361/433 |
| 3,793,215 | 2/1974 | Smith | 252/117 |
| 3,926,829 | 12/1975 | Smith et al. | 252/132 |
| 3,951,879 | 4/1976 | Wixon | 252/547 |
| 4,017,660 | 4/1977 | Barraud et al. | 361/311 |
| 4,139,273 | 2/1979 | Crossland et al. | 350/350 S X |
| 4,139,485 | 2/1979 | Imokawa et al. | 252/135 |
| 4,196,974 | 4/1980 | Hareng et al. | 350/350 S X |
| 4,201,435 | 5/1980 | Perla et al. | 264/148 |
| 4,285,826 | 8/1981 | Bertozzi et al. | 252/117 |
| 4,385,807 | 5/1983 | Perbet et al. | 350/350 S |
| 4,474,683 | 10/1984 | Story et al. | 252/369 |
| 4,490,280 | 12/1985 | Joshi et al. | 252/368 |
| 4,493,786 | 1/1985 | Joshi | 252/368 |
| 4,622,611 | 11/1986 | Bennett et al. | 361/433 |
| 4,626,959 | 12/1986 | Shedigan et al. | 361/433 X |
| 4,630,176 | 12/1986 | Cuellar et al. | |
| 4,633,372 | 12/1986 | Calahan et al. | 361/433 |
| 4,638,407 | 1/1986 | Lundsgaard | 361/433 |

FOREIGN PATENT DOCUMENTS

| | | | |
|---|---|---|---|
| 16658 | 2/1979 | Japan | 361/323 |
| 37291 | 11/1979 | Japan | 361/323 |
| 14648 | 2/1980 | Japan | 361/313 |
| 48403 | 3/1984 | Japan | 252/567 |
| 1033816 | 6/1966 | United Kingdom | 361/323 |
| 1599644 | 10/1981 | United Kingdom | 361/433 |

OTHER PUBLICATIONS

Japanese Publication 49,105, (Matsushita Electric) Published Mar. 21, 1984.

"Persistencey of Surface Charge of Thermal Electrets of Carnauba Wax, Esters, Fatty Acids and Alcohols", Takanatsu, et al., Rep. Inst. Phys. and Chem. Res. (Japan) vol. 53, No. 3, pp. 49–61, (1977).

"Electron Tunneling Through Fatty-Acid Monolayers", E. Polymeropoulos, J. Appl. Phys. (U.S.) vol. 48, No. 6, pp. 2404–2407, (June 1977).

"Dielectric Studies of Temperature Transistions in Soap-Hydrocarbon Systems", Deinega et al., Kolloidn, Zh., vol. 45, No. 3, pp. 553–557, (1983).

"Study of Dielectric Relaxation and Dipole Moments of Chromium (II) Salts of Some Fatty Acids", Pardeshi, L., Acta Cieno, Indica (Ser.) Chem., vol. 8, (1982).

"Japanese Publication 16,658", (Nisshin Electrical) Published Feb. 2, 1979.

Primary Examiner—Donald A. Griffin
Attorney, Agent, or Firm—Bernard Lieberman; Murray M. Grill; Robert C. Sullivan

[57] ABSTRACT

A polarizable material having a liquid crystal microstructure comprised of an amphipathic compound and a liquid useful for making electrical storage devices. In one embodiment, the polarizable material is comprised of commercially available solid bar soap and neat soap and employed as the dielectric in a capacitor.

56 Claims, 18 Drawing Sheets

Fig. 23.

| Fatty Acid | Carbon Atoms | Double Bonds | VEGETABLE | | | | | | | | | | | | | | ANIMAL | | | | MARINE | | | |
|---|---|---|---|---|---|---|---|---|---|---|---|---|---|---|---|---|---|---|---|---|---|---|---|---|
| | | | Babassu | Castor | Coconut | Corn | Cottonseed | Linseed | Olive | Palm | Palm Kernel | Peanut | Rapeseed | Sesame | Soybean | Tuna | Lard | Mutton | Neatsfoot | Beef Tallow | Herring | Menhaden | California Sardine | Whale |
| Caproic | 6 | 0 | 0.2 | | 0.5 | | | | | | 0.5 | | | | | | | | | | | | | |
| Caprylic | 8 | 0 | 6.3 | | 8.0 | | | | | | 3.0 | | | | | | | | | | | | | |
| Capric | 10 | 0 | 9.0 | | 7.0 | | | | | | 6.0 | | | | | | | | | | | | | |
| Lauric | 12 | 0 | 46.5 | | 48.0 | | | | | | 50.0 | | | | | | | | | | | | | |
| Myristic | 14 | 0 | 21.0 | | 18.5 | | 0.5 | | 0.2 | 1.0 | 15.0 | | 0.5 | | | | 1.0 | 2.0 | | 3.0 | 7.0 | 7.0 | 5.0 | 8.0 |
| Myristoleic | 14 | 1 | | | | | | | | | | | | | | | | 0.5 | | | 0.4 | 0.6 | 0.1 | | 2.0 |
| Palmitic | 16 | 0 | 7.0 | | 9.0 | 8.0 | 21.0 | 5.0 | 8.0 | 42.0 | 7.5 | 7.0 | 1.5 | 8.0 | 0.1 | 4.0 | 26.0 | 24.0 | 17.0 | 29.0 | 14.0 | 15.0 | 15.0 | 15.0 |
| Palmitoleic | 16 | 1 | | | | | | | | | | | | | 0.2 | | | | | | | | | | |
| Stearic | 18 | 0 | 15.0 | 1.0 | 3.0 | 3.5 | 2.0 | 4.0 | 2.0 | 4.5 | 2.0 | 5.0 | 1.0 | 4.5 | 4.0 | 1.0 | 13.0 | 30.0 | 4.0 | 21.0 | 5.0 | 16.0 | 12.0 | 13.0 |
| Oleic | 18 | 1 | | 3.0 | 5.0 | 46.0 | 32.0 | 20.0 | 83.6 | 43.5 | 15.0 | 59.0 | 20.0 | 47.0 | 29.0 | 9.0 | 47.0 | 40.0 | 19.0 | 45.0 | 0.5 | 2.0 | 3.0 | 3.0 |
| Ricinoleic | 18 | 1 | | 87.0 | | | | | | | | | | | | | | | | | 7.0 | 16.0 | 6.0 | 23.0 |
| Linoleic | 18 | 2 | | 9.0 | | 41.8 | 44.0 | 25.0 | 6.0 | 9.0 | 1.0 | 23.0 | 20.0 | 48.0 | 54.0 | 3.5 | 7.0 | 4.0 | | 2.0 | 13.0 | 7.9 | 11.5 | 9.5 |
| Linolenic | 18 | 3 | | | 2.0 | | | 45.5 | | | | | 2.0 | | 5.0 | 2.5 | 0.5 | | | 0.5 | 1.0 | 1.0 | | 1.5 |
| Eleosteric | 18 | 3 | | | | | | | | | | | | | 0.7 | 80.0 | | | | | | | | |
| Arachidic | 20 | 0 | 1.9 | | | 0.5 | 0.5 | 0.3 | 0.2 | | | 3.0 | 0.5 | 0.5 | | | | | | 0.5 | | | | |
| Cadoleic | 20 | 1 | | | | | | | | | | | | | | | 2.0 | | | | 15.0 | | 10.0 | |
| Arachidonic | 20 | 3-5 | | | | | | | | | | | 1.0 | | | | | | | 0.1 | 13.0 | 17.0 | 8.0 | 16.0 |
| Behenic | 22 | 0 | | | | | | | | | | 1.0 | 1.0 | | | | | | | | | | | | |
| Erucic | 22 | 1 | | | | | | | | | | | 51.5 | | | | | | | | 16.0 | | | |
| Clupendonic | 22 | 3-5 | | | | | | | | | | 2.0 | 2.0 | | | | | | | | 8.0 | 11.0 | 14.0 | 9.0 |
| Lignoceric | 24 | 0 | | | | 0.2 | | 0.2 | | | | | | | | | | | | | | | 15.5 | |
| | | | | | | | | | | | | | | | | TYPICAL CHARACTERISTICS | | | | | | | | |
| Iodine Value | | | 12-18 | 82-90 | 8-10 | 115-130 | 106-115 | 170-200 | 79-88 | 44-56 | 14-23 | 85-95 | 97-105 | 100-115 | 125-140 | 160-175 | 50-70 | 35-45 | 65-75 | 38-48 | 130-145 | 145-155 | 185-190 | 110-140 |
| Saponification Value | | | 240-250 | 177-181 | 251-263 | 187-193 | 194-196 | 188-195 | 188-195 | 196-205 | 245-255 | 186-190 | 170-180 | 187-193 | 189-195 | 188-190 | 194-202 | 192-198 | 192-197 | 193-200 | 170-180 | 183-190 | 186-191 | 165-195 |
| Titer -°C | | | 22-25 | 8 | 20-23 | 15-19 | 32-36 | 19-21 | 17-24 | 40-47 | 20-15 | 28-32 | 11-15 | 20-24 | 20-23 | 36-38 | 34-42 | 40-47 | 20-30 | 41-45 | 23-27 | 31-33 | 28-32 | 22-29 |

POLARIZABLE MATERIAL HAVING A LIQUID CRYSTAL MICROSTRUCTURE AND ELECTRICAL COMPONENTS PRODUCED THEREFROM

BACKGROUND OF THE INVENTION

1. Field of the Invention

This invention relates generally to a polarizable material having a liquid crystal microstructure useful in electrical devices and comprised of one or more amphipathic compounds and a liquid. More specifically, this invention relates to a lamellar liquid crystal material useful in the manufacture of electrical devices such as capacitors, piezoelectric transducers, memory elements, insulators, semiconductors, rectifiers, detectors, electrostatic copying devices and in devices that generate and reflect electromagnetic waves. An embodiment of this invention is a parallel plate capacitor structure that can be charged and discharged comprised of a neat or solid bar phase soap dielectric material positioned between conducting electrodes.

2. Prior Art of the Invention

Various electrical properties of organic materials such as waxes and resins have been disclosed in the prior art. In U.S. Pat. No. 1,952,158 issued to Clark et al. a colloidal gel is disclosed which remains plastic and stable at temperatures as low as −20° C. and as high as 110° C. and which comprises mineral oil and a small proportion of metallic soap as a dielectric material. Clark et al. disclose that when 2 to 12% wt. of metallic soap is added to approximately 90% wt. of mineral oil, a colloidal gel is formed which functions as a dielectric.

U.S. Pat. No. 1,576,096, issued to Davey discloses the use of purified glycerides, essentially water free unsaturated fatty acids or the various soaps of the fatty acids in conjunction with a cellulose paper, as the dielectric material in capacitors. Davey attributes enhancement of the dielectric behavior of the cellulose paper to the addition of the purified glycerides, the essentially water-free unsaturated fatty acids or the various soaps of the fatty acids, which are believed to entrap residual water molecules on the surface of the cellulose paper so that the water does not contribute to the conductivity of the paper.

Methods for producing electrets from molten wax and wax-like materials solidified in an electric field are well known in the art. See U.S. Pat. Nos. 1,804,364; 1,886,235; 2,024,705; 2,986,524; 2,284,039 and 2,460,109. Electrets are quasi-permanent charged dielectric materials useful as tranducers in microphones, earphones, phonograph cartridges and the like.

U.S. Pat. 3,301,786, issued to Klass discloses a synthetic ferroelectric article comprised of a dispersion of a solid silica compound in an organic vehicle such as a polyoxyalkylene, paraffin wax, microcrystalline wax or polypropylene. Klass induces permanent electret properties on the opposite sides of his dispersion by subjecting a melted slab thereof to d.c. current during copling.

U.S. Pat. 3,458,713, issued to Pearlman et al., discloses an electret comprised of a high molecular weight polycyclic bisphenol polycarbonate which has been permanently electrostatically polarized. Pearlman et al. disclose that such compounds retain electric charge for long periods of time, e.g., ten years.

U.S. Pat. No. 2,916,792, issued to Crook, et al. discloses an apparatus and method for controlling the rate of extrusion of soap bars by passing the soap bars which have a dielectric constant higher than air between the electrodes of a detecting capacitor and measuring changes in the capacitance thereof.

It can be seen from the foregoing prior art references that there is an ongoing effort to fill the need for materials having desirable electrical properties particularly, high dielectric constants and good capacitance and that can be easily and economically produced.

SUMMARY AND OBJECTS OF THE INVENTION

It is an object of the present invention to provide a polarizable material having liquid crystal microstructure comprised of an amphipathic compound and a liquid.

It is a further object of the present invention to provide a material having a liquid crystal microstructure and that exhibits desirable dielectric properties particularly, high capacitance.

It is a further object of the present invention to provide a material having a liquid crystal microstructure which subjected to an electric field.

It is a further object of the present invention to provide a material having a liquid crystal microstructure which can function as a memory element, an insulator, a semiconductor, a rectifier or similar device useful in electronic equipment.

It is a further object of the present invention to provide a material having a liquid crystal microstructure which can generate and/or reflect electromagnetic waves.

It is a further object of the present invention to provide material having a liquid crystal microstructure which can be repetitively and sequentially charged by application of an electric field and discharged and that may be utilized in devices for storing electrical energy.

It is a further object of the present invention to provide a material having a polarized liquid crystalline microstructure comprised of a mixture of fatty acid salt molecules, water and an electrolyte compositionally defined so that a neat soap microstructure is formed.

It is a further object of the present invention to provide a polarized material having a smectic liquid crystalline microstructure having a lamellar configuration that is useful in electrical storage devices.

It is a further object of the present invention to provide a polarized or charged liquid crystalline material having a lamellar liquid crystalline microstructure which slowly discharges in response to a load and recharges itself.

In accordance with the aforementioned objects the present invention provides a composition comprising a shape-retaining polarized material having a liquid crystal microstructure comprised of an amphipathic compound and a liquid. The polarizable materials of the present invention may exhibit useful electret, ferroelectric, pyroelectric, semiconductor, insulator and transducer properties.

The present invention also provides an electrical device characterized by a material having a liquid crystalline microstructure, preferably lamellar, composed of an amphipathic compound and a liquid and electrical transmission means connected thereto. The term electrical transmission means is used herein to refer to any means for coupling the polarizable materials of this invention to an electrical circuit. The preferred amphipathic compounds are salts of a fatty acids and preferably selected from a group consisting of alkaline metal, alkaline earth metal, ammonium and alkanolammonium salts of the fatty acids. The preferred liquid is water and may further include a electrolyte such as a soluble ionic salt, e.g., NaCl.

The polarizable materials of the present invention having a liquid crystalline microstructure may be a simple binary mixture of an amphipathic compound and a liquid in appropriate quantities to achieve the desired microstructure.

It has been discovered that the polarizable liquid crystalline materials of the present invention may be utilized as a dielectric in a parallel plate capacitor device. The device may be charged with a DC current and the charged device discharges in response to a load at first quickly in a manner that would be expected for a capacitor and then more slowly in a manner that would be expected for a storage battery. Interestingly, the electrical potential of the device is not instantaneously discharged by shorting and restores itself when the load is removed.

BRIEF DESCRIPTION OF THE DRAWINGS

The various properties and characteristics of the present invention will now be further illustrated and better understood by reference to the following drawings.

FIG. 23 is a table illustrating the fatty acid distribution in common fatty acid source materials.

DETAILED DESCRIPTION OF THE INVENTION

Figure 1:
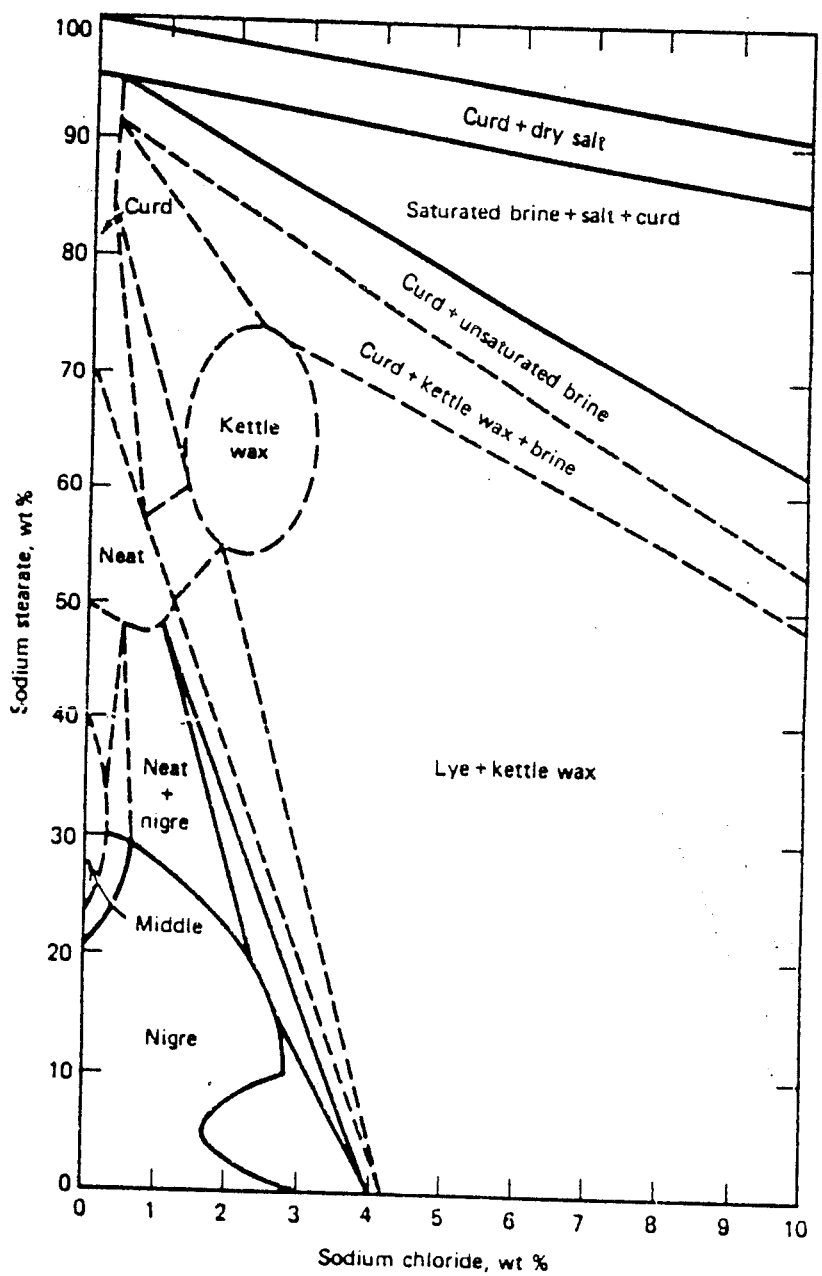
FIG. 1 is a phase diagram of a ternary system of sodium stearate- sodium chloride-water at 90° C. reprinted, with permission of the publisher from Kirk-Othmer "Encyclopedia of Chemical Technology", Vol. 21 (3d Ed. 1979), © John Wiley & Sons, Inc.

The compositional nature and the electrical behavior of the materials of the present invention will now be discussed in more detail.

The amphipathic compounds used in the practice of this invention include molecules having a polar or hydrophilic end and non-polar or hydrophobic end and each of these ends is large enough to display its own solubility behavior in the liquids as hereinafter described. The amphipathic compounds are known to orient themselves in polar liquids so that their nonpolar ends (e.g., the hydrocarbon portion of a soap molecule) dissolve in one another while their polar ends (e.g., the —COO— groups) project outwardly into the polar solvent thus exhibiting a controlled preference in orientation that produces liquid crystals. This orientation is reversed in non-polar solvents, Morrison and Boyd, Organic Chemistry, Chpt. 33 (3d Ed. 1973); Kirk-Othmer "Encyclopedia of Chemical Technology" Vol. 14, p. 395 et seq.) (3d Ed. 1980). Preferred amphipathic compounds for use in this invention include salts of fatty acids, such as, alkali metal salts, alkaline earth metal salts, ammonium salts and alkanolammonium salts, more particularly sodium and potassium salts. These preferred fatty acid salts may include a saturated or unsaturated aliphatic moiety of about 6 to 18 carbon atoms, for example, sodium oleate, stearate or palmitate.

Presently, the most preferred fatty acid salts are commercial soaps which are typically mixtures of the sodium salts of fatty acids of even carbon number ranging from about 12 to 18 carbons. Commercial soaps may be made by well known methods such as the hydrolysis of saponifiable fats, grease and oils such as, tallow and other animal fats; cottonseed oil and other vegetable oils and fats; fish oils, rosin and other resinous substances; and coconut oil, palm kernel oil, babassu oil, palm oil, olive oil, tall oil, castor oil, groundnut oil, linseed oil and hydrogeneated versions of these fats and oils. The fatty acid content of useful fatty acid source materials are listed in FIG. 23. Conventional soap making processes are described in U.S. Pat. Nos. 2,037,006; 2,190,592; 2,336,893; 3,793,215; 3,296,829; 4,201,743 and 4,490,280.

A kettle process for the preparation of neat soap is described in U.S. Pat. No. 3,928,829 the text of which is incorporated herein by reference. Briefly, the steps in preparing a neat soap are 1) the killing or saponification stage in which an aqueous solution of fatty acid source material, e.g., a 75/25 mixture of tallow and coconut oil, is heated with caustic, e.g., sodium hydroxide, to convert a substantial portion of the fatty acids to their salts; 2) the change stage in which the fatty acid salts are precipitated out of the solution; and 3) the "fitting stage" in which the neat soap phase (that is, the portion of the mixture that has a lamellar liquid crystal microstructure) is removed from the nigre phase. Of course, neat soap may be made by other soap making processes well known to those skilled in the art.

It has also been found that commercially available solid soaps are useful in this invention, as illustrated in greater detail in the examples which follow.

The liquid in the polarizable material of this invention is provided in sufficient quantity and selected to enable the amphipathic compounds to organize into the desired liquid crystal microstructure. The preferred liquid components are polar liquids, particularly water. The liquid component should also solubilize any electrolyte included in the polarizable material.

The preferred neat soaps of this invention include about 70 to 90% wt. fatty acid salts which may be derived from any fatty acid salt source material; about 10 to 30% wt. water and about 0 to 4% wt. sodium chloride more preferably about 0.6 to 1.2% wt. sodium chloride. Useful fatty acid salt source materials are listed above and typically fatty acid distributions for such source materials are summarized in FIG. 23. The fatty acid source materials may be used alone or in various combinations to adjust the constituent fatty acid salts in the soap, e.g., 25% wt. tallow and 75% wt. coconut; 60% wt tallow and 40% wt. coconut; or 85% wt. tallow and 15% coconut.

It will be appreciated by those skilled in the art that the orientational associations of molecules in liquid crystal microstructures, such as neat soaps, are extraordinarily sensitive to external perturbations and that changes in temperature, pressure and electrical and magnetic fields may cause significant changes in the long range order of the molecules.

Solid bar soaps are usually prepared from neat soap by drying; reducing the size of the dry material by chipping, chopping, or the like; mixing the dry particles with no more than about 20% wt., and preferably less than about 2% wt., of additives such as fragrance, colorants, emmolients, antibacterials, preservatives and the like; and shaping the mixture into bars or some other desired shape usually by extrusion. The smectic lamellar microstructure that characterizes neat soaps is changed, primarily by mechanical forces, during preparation of solid bar soap, temperature and moisture. The solid bar soap microstructure is characterized by an interlocked mesh of fiber bundles of varying diameters and different degrees of twist but with a general tendency toward retaining both a criss-cross and a parallel structure. The microstructure of solid bar soap is referred to herein as 'bar phase' microstructure.

The electrolyte employed in this invention may be a simple ionic salt such as sodium chloride and may be present either as an impurity from the process of making the amphipathic compound or as an additive derived from some other source. The quantity of electrolyte should not exceed the amount at which the electrical resistance of the material becomes less than the amount at which the neat phase microstructure is disrupted, e.g., in commercial soaps more than about 4% wt. NaCl disrupts the neat phase. Generally, the salt content is at least about 0.1% wt.

The amphipathic compounds and liquid are combined in the necessary compositional amounts to produce the desired liquid crystal structure. For commercial soaps the necessary compositional amounts may be determined by locating the neat phase region on the McBain phase diagrams. A discussion of McBain's phase diagrams of binary and ternary systems of soap-water and soap-salt-water appears in Kirk-Othmer "Encyclopedia of Chemical Technology", Vol. 21, pp. 166–170 (3d Ed. 1980). The phase behavior of the polar liquid, and amphipathic components of soap in the neat phase appear to enhance the polarizable material's electric properties.

Figure 2:
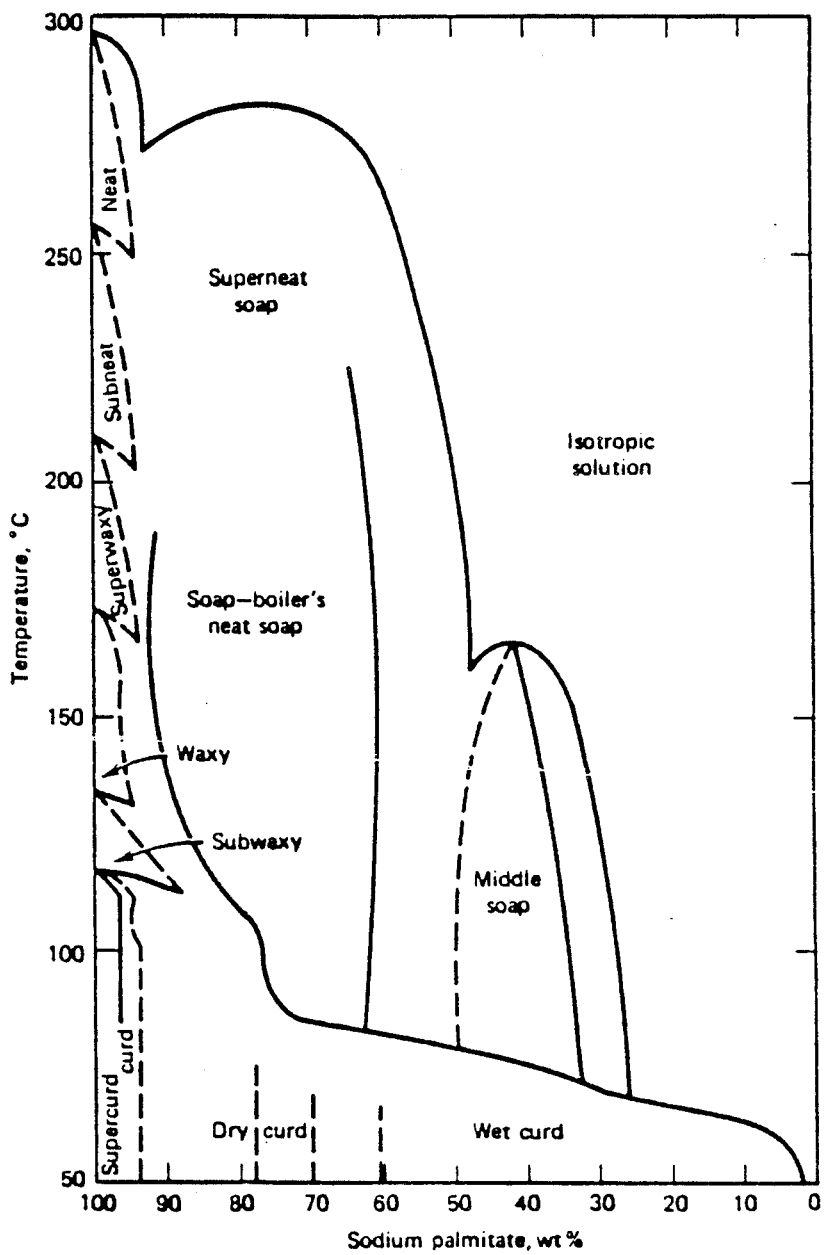
FIG. 2 is a binary phase diagram for sodium palmitate-water reprinted, with permission of the publisher, from Kirk-Othmer "Encyclopedia of Chemical Technology", Vol. 21 (3 Ed. 1979), © John Wiley & Sons, Inc.

FIG. 1 illustrates a ternary system of sodium stearate, sodium- chloride and water at 90° C. FIG. 2 illustrates a binary system of sodium palmitate and water. Comparison of FIGS. 1 and 2 illustrates that a system comprised of approximately 70% soap and 30% water and only a residual amount of salt (e.g., less that 0.5% wt.) falls within the neat phase structural range.

A notable property of soap in the neat phase is the solid-like consistency of the system, i.e., it may be readily manufactured in bar, flake or bead form. A heretofore unappreciated property of such solid-like systems in the neat phase is an unexpectedly high dielectric constant.

Large variations of the dielectric constant (K) of the liquid crystalline material of this invention with temperature have been observed and their dielectric properties have shown sensitivity to fatty acid salt and water concentration. Although not fully understood, the large dielectric constants of these liquid crystal materials is believed to be associated with some structural phase transition of a ferroelectric type. Ferroelectric compositions exhibit a phase showing a twin or domain structure in which individual domain states may be reoriented by applied electric fields and they may also be responsive to magnetic and elastic stress fields and various combinations thereof.

Figure 3:
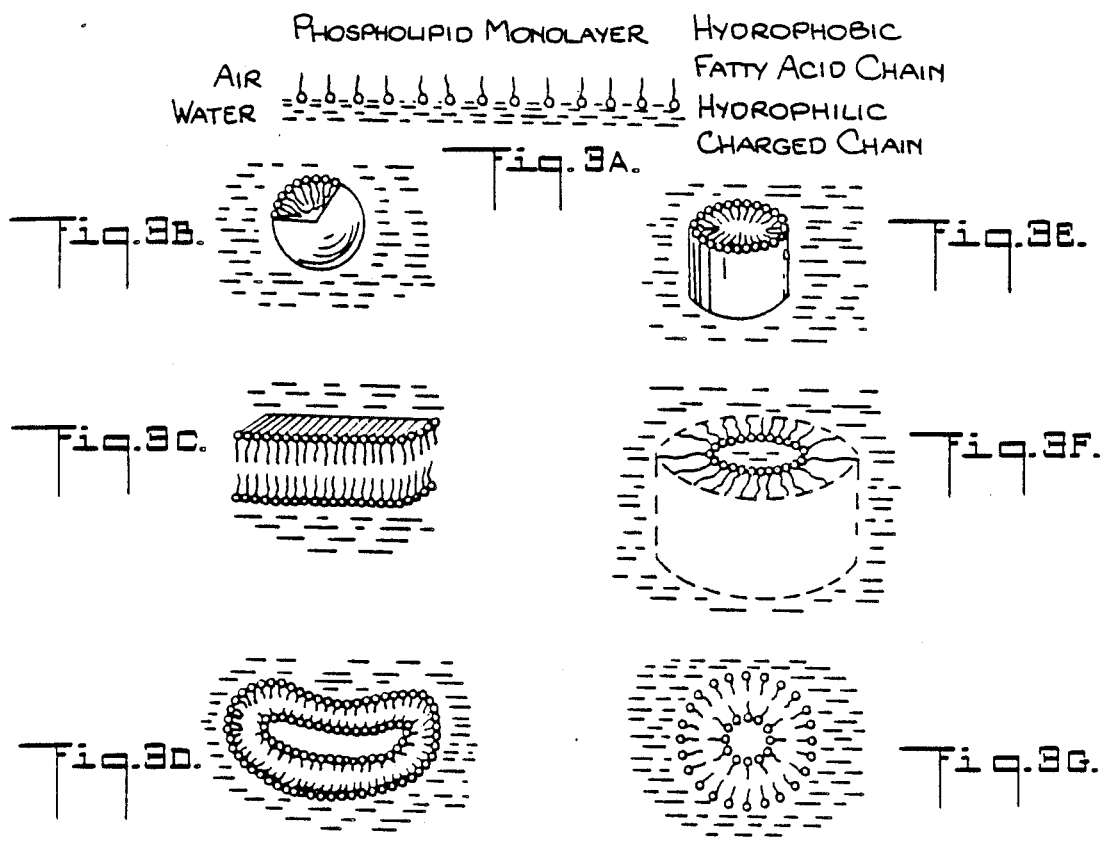
FIG. 3 illustrates the microstructural arrangements in lyotropic systems of mesomorphic or amphiphilic molecules having a spherical or lamellar configuration reprinted, with permission of the author and publisher, from G. H. Brown and J. J. Walken, "Liquid Crystals and Biological Structure", © 1979 Academic Press, Inc.

It is also possible that the advantageous electrical properties of neat soaps result from a structural phase transition that affects the liquid crystalline lamellar or micelle microstructure illustrated in FIG. 3 or the bar phase microstructure of solid bar soaps.

The microstructures of the composition of the present invention may be characterized as a liquid crystal microstructure. The terms "liquid crystal" and "mesomorphic" may be used to describe physical properties of the materials of this invention because these materials exhibit a dualism of physical state, i.e., both solid and liquid behavior. The liquid crystalline behavior of amphipatic compounds is discussed in Kirk-Othmer "Encyclopedia of Chemical Technology", Vol. 14, pp. 395–427 (3d Ed. 1980) which is herein incorporated by reference. These properties are believed to be dictated or derived from orientational ordering of the constituent molecules of the materials in response to the liquid which impart the solid-like properties to the materials although these attractive and ordering forces are insufficient to totally exclude liquid properties. The liquid crystal material of this invention is lyotropic in the sense that it is a multi-component system and the ordering/orientating, e.g., formation of lamellar, bar phase and micelle microstructures, by the constituent molecules (amphipathic compound) results from the action of the liquid (water).

Detailed embodiments of the invention will now be described in the following examples.

EXAMPLE I

The dielectric constants of bulk samples of various commercially available solid bar soaps were tested for the variation of their dielectric constant over temperature. In the examples which follow these samples will be referred to by their registered trademarks. Palmolive®, Irish Spring®, and Cashmere Bouquet® are registered trademarks of the Colgate Palmolive Company. The dielectric constants of Palmolive®, Irish Spring® (superfatted), Cashmere Bouquet® and standard brand commercially available solid bar soap hereinafter referred to as soap A were measured at a frequency of 1 kHZ over a temperature range from 21° C. to 160° C. Very strong temperature variations in the real component of the complex dielectric constant $E'$ were observed at temperatures ranging from about 10° C. to 130° C. depending on the composition of the solid bar soap. This variation was found to be dependent in part on the water content of the solid bar soap, for example, Irish Spring® (superfatted) solid bar soap with 10% wt. water showed an $E'$ peak value of 1,488,000 at 118° C. and Irish Spring® (superfatted) solid bar soap with a water content of 15% wt. had an $E'$ peak value of 5,861,000 at 107° C. From these observations it was concluded that the dielectric constant exhibited strong sensitivity to the solid bar soap composition and water concentration. As mentioned above the enormous increase in dielectric constant with temperature suggests a structural phase transition of a ferroelectric type. $E'$ values were measured for the various bar soaps as follows.

Figure 4:
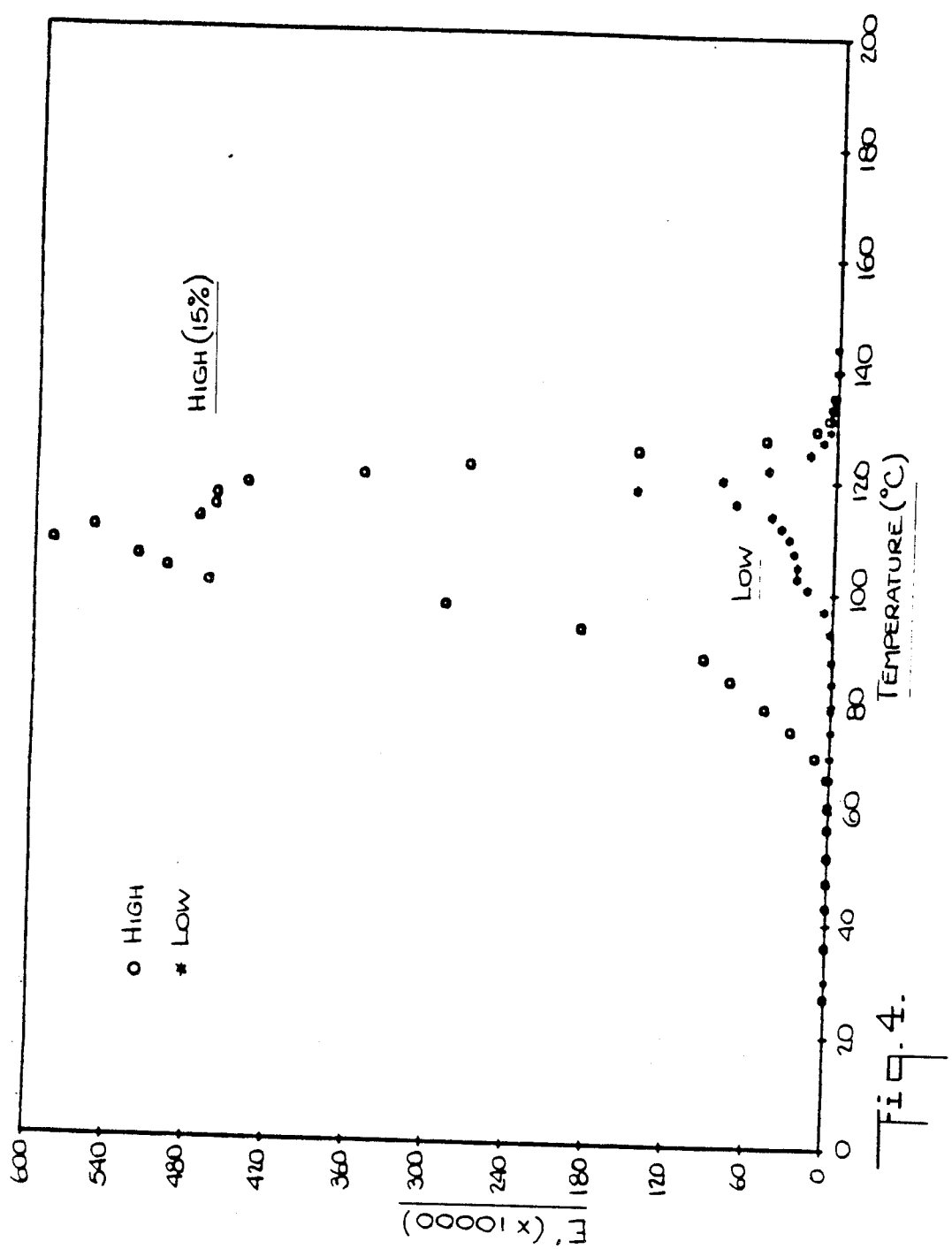
FIG. 4 illustrates the variation of the real component of the dielectric constant E' with temperature for samples of solid bar soaps having a 10% wt. and 15% water content as set forth in Example I.
Figure 5:
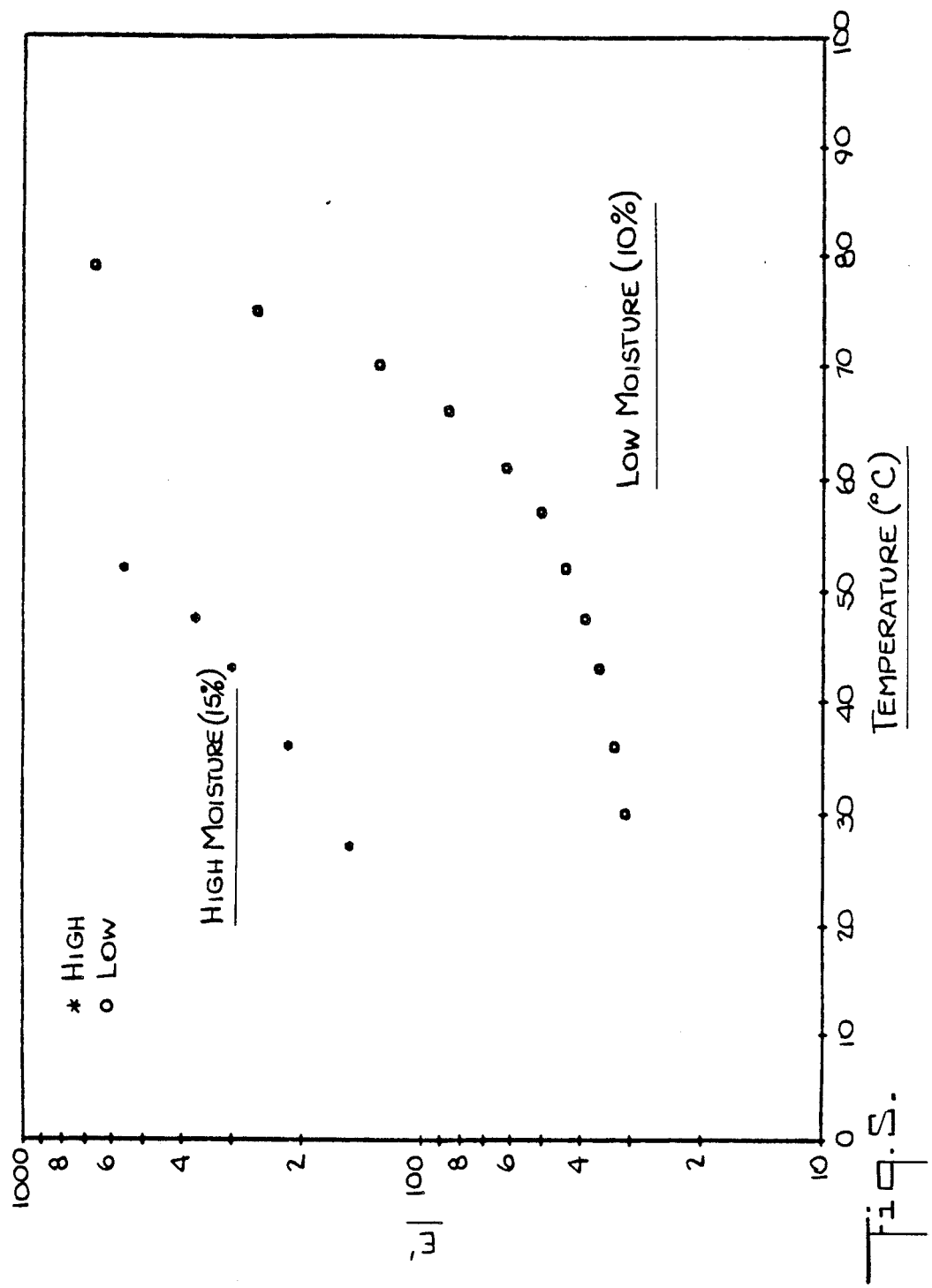
FIG. 5 illustrates on an expanded scale the variation of the real component of the dielectric constant E' with temperature for samples of solid bar soaps having a 10% wt. and 15% wt. water content as set forth in Example I.

Samples of bar soap ⅜" thick by 2" wide by 3" long were cut by milling and placed between two flat, parallel gold plated electrodes. The samples were clamped between the two gold plated capacitor electrodes and held in place with electrically insulating bolts so that the surfaces of the soap made good contact with the electrodes but did not plastically flow. The upper electrode was divided into a circle 1½" in diameter and a guard ring 4" in diameter which was electrically insulated from the center electrode. The base electrode was a 4" diameter circular plate. The electrodes were then connected through three coaxial cables to a General Radio 1615-A Capacitance Bridge. A General Radio 1311-A oscillator set at 1 kHZ was used to drive the bridge. A Princeton Applied Research HR-8 amplifier sensitive to phase was used as a null detector to balance the bridge. The mounted sample was placed in a stainless steel thermos and heated by resistive heaters directly connected to the electrodes. The temperature was measured with chrome-aluminum thermocouples attached to the electrodes. Heating rates were approximately 2° C. per minute. Samples were checked for water loss by weighing before and after heating, and showed negligible weight loss (less than 0.1% wt.) which occurred mostly along the edges of the samples which were outside the central 1½" electrode which was used for measurement in the three electrode technique. Capacitance values were measured using the in-phase component and the out-of-phase component of the dielectric response. At temperatures above 80° C. the capacitance typically would exceed the upper range of the bridge (1 Farad) and so external resistors were added to the circuit. With external resistors the mutual conductance could not be balanced and consequently imaginary parts of the dielectric constant could not be measured. From the primary capacitance measurements, the real component of the dielectric constant $E'$ was calculated using the thickness (⅜ inch) of the sample and the central electrode area. No attempt was made to correct for possible electrode fringe effects. Subsequent d.c. measurements between the electrodes showed a resistance in the hundreds of megohms at room temperature. High d.c. voltages resulted in permanent polarization of the soap into an electret. The electrets exhibited piezoelectric behavior and possibly permanent structural changes that made subsequent dielectric measurements impossible. FIGS. 4 and 5 illustrate the variation of the real component of the dielectric constant $E'$ with temperatures for Irish Spring® (superfatted) 10% wt. and 15% wt. water solid bar soaps. The appearance of the very narrow and very strong peak at 118° C. in the 10% wt. water sample strongly suggests a structural phase transition of the sort observed in ferroelectric materials at their critical temperature.

As illustrated in FIGS. 4 and 5, the effect of water addition to the bar soap is to increase the dielectric constant so that at 27° C., $E'=52$ K, and at 107° C., $E'=5,861,000$. FIG. 5 shows that even at 40° C. there is nearly a tenfold difference between the the value of real component of the dielectric constant $E'$ for the 10% wt. water solid soap bar sample and that of the 15% wt. water solid soap bar sample.

EXAMPLE II

Figure 6:
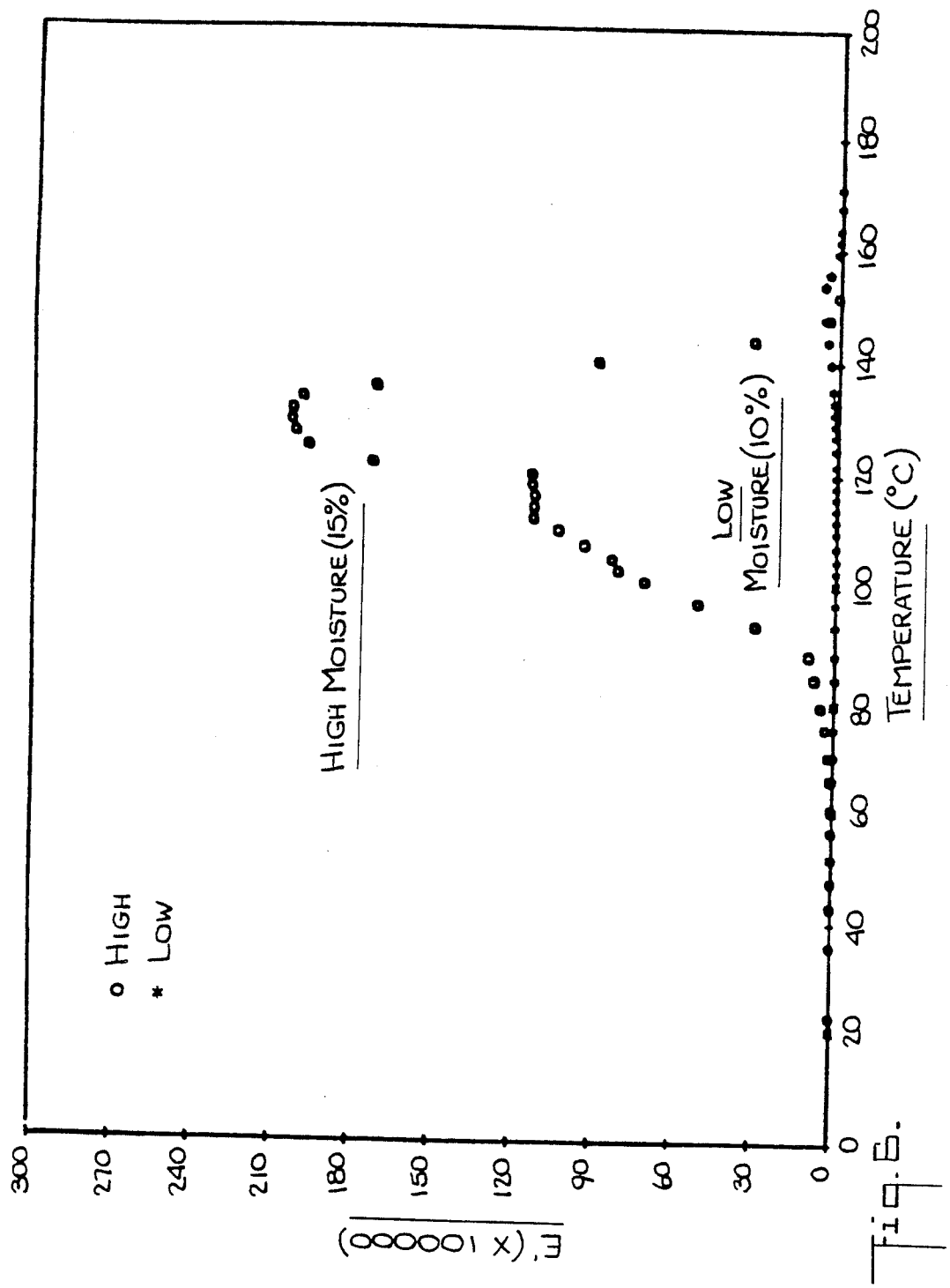
FIG. 6 illustrates the variation of the real component of the dielectric constant E' with temperature for samples of solid bar soaps having a 10% wt. and 15% wt. water content as set forth in Example II.
Figure 7:
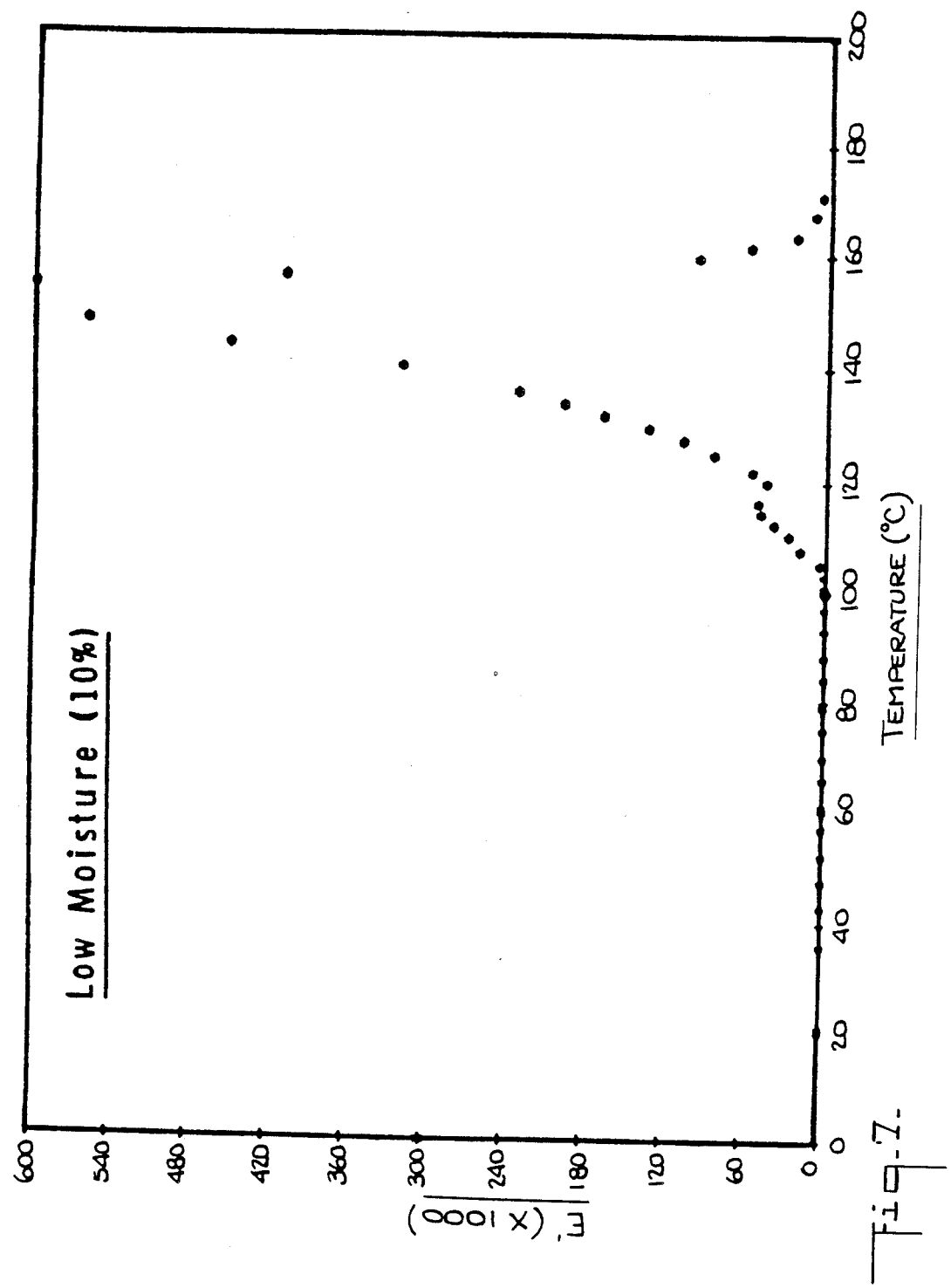
FIG. 7 illustrates on an expanded scale the variation of the real component of the dielectric constant E' with temperature for a sample of solid bar soap having a 10% wt. water content as set forth in Example II.

The variation of the real component of the dielectric constant $E'$ of Palmolive® solid bar soap with temperature was determined in accordance with the method described in Example I. FIG. 6 illustrates the variation of the real component of the dielectric constant $E'$ with temperature for Palmolive® 15% wt. water soap and Palmolive® 10% wt. water bar soap. An expanded scale illustration of the variation of $E'$ with temperature for low moisture (10% wt. water) Palmolive® solid bar soap is depicted in FIG. 7. In FIG. 7 peaks occur at 118° C. and 150° C. and the $E'$ values observed were higher than those observed in the testing of the Irish Spring® solid bar soaps described in Example I. It may also be observed by comparison of FIGS. 6 and 7 that changes in the solid bar soap moisture content shifted the temperature location of the $E'$ peaks.

Figure 8:
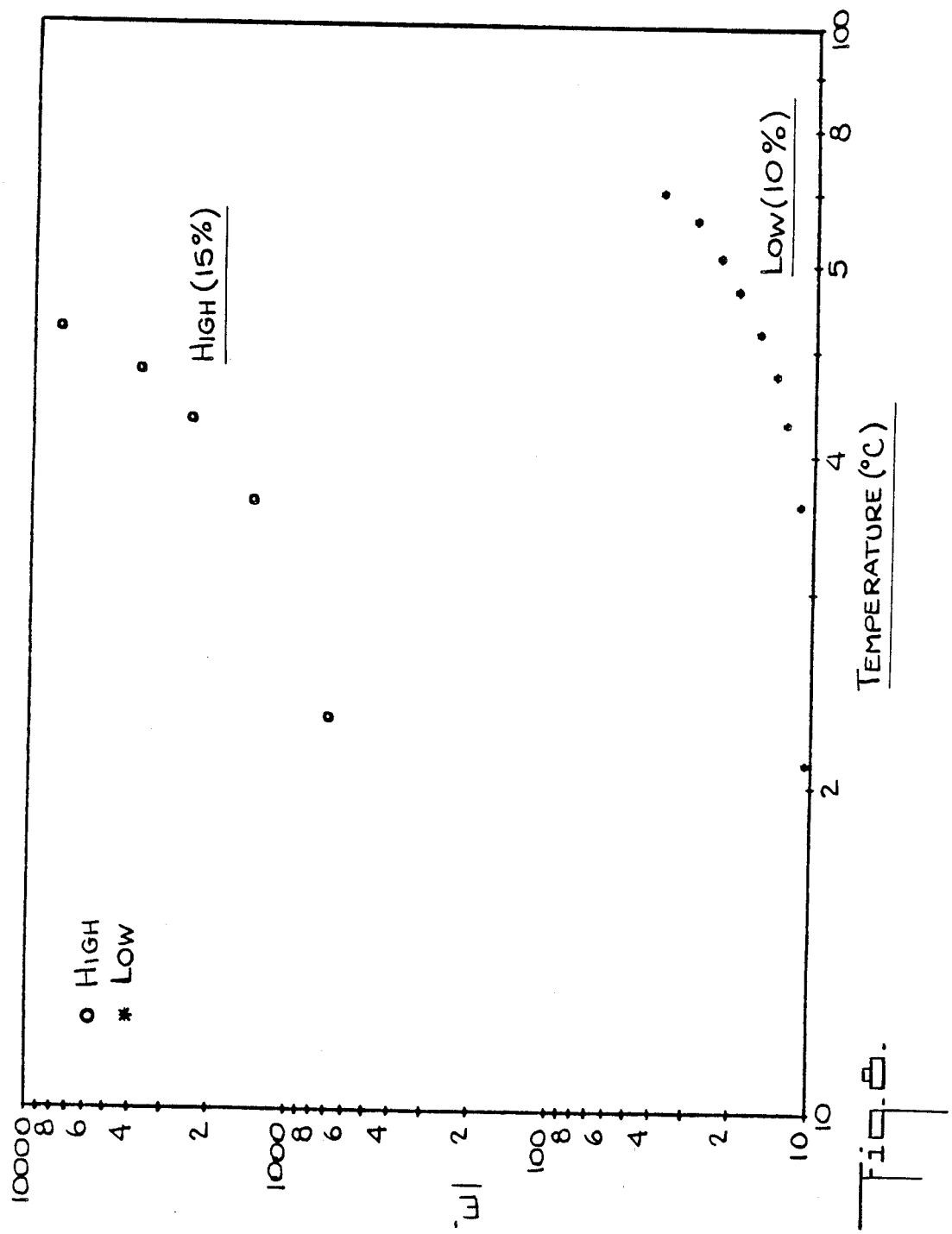
FIG. 8 illustrates on an expanded scale the variation of the real component of the dielectric constant E' with temperature for solid bar soap having a 10% wt. and 15% wt. water content as set forth in Example II.

FIG. 8 provides an expanded scale comparison of the dielectric constant of the 10% wt. water and 15% wt. water Palmolive® solid bar soaps with temperature.

EXAMPLE III

Figure 9:
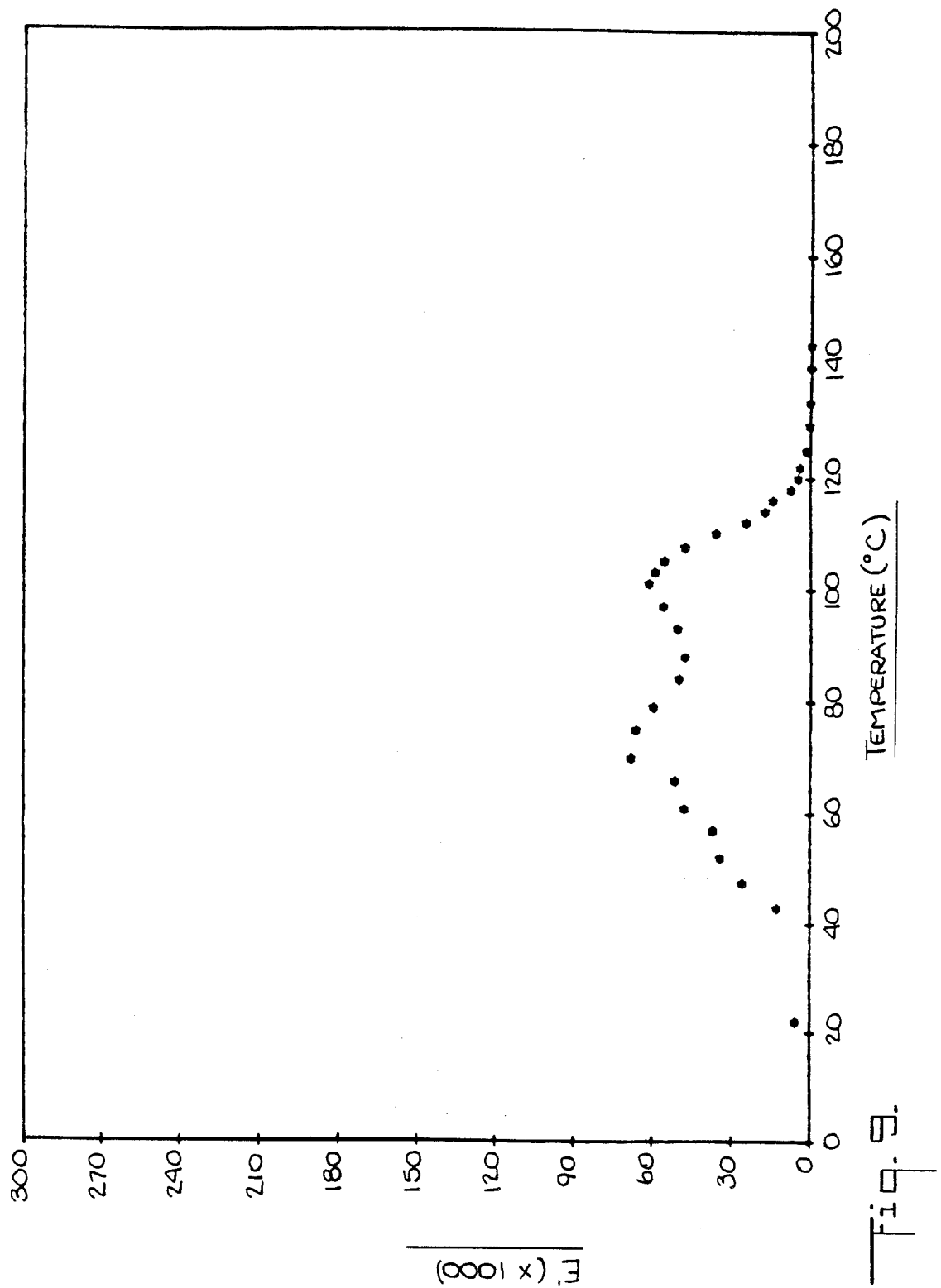
FIG. 9 illustrates the variation of the real component of the dielectric constant E' with temperature for solid bar soap A as set forth in Example III.

The variation of the real component of the dielectric constant $E'$ of solid bar soap A with temperature was determined in accordance with the method described in Example I. The values of the real component of the dielectric constant determined by this experiment are illustrated in FIG. 9.

EXAMPLE IV

Figure 10:
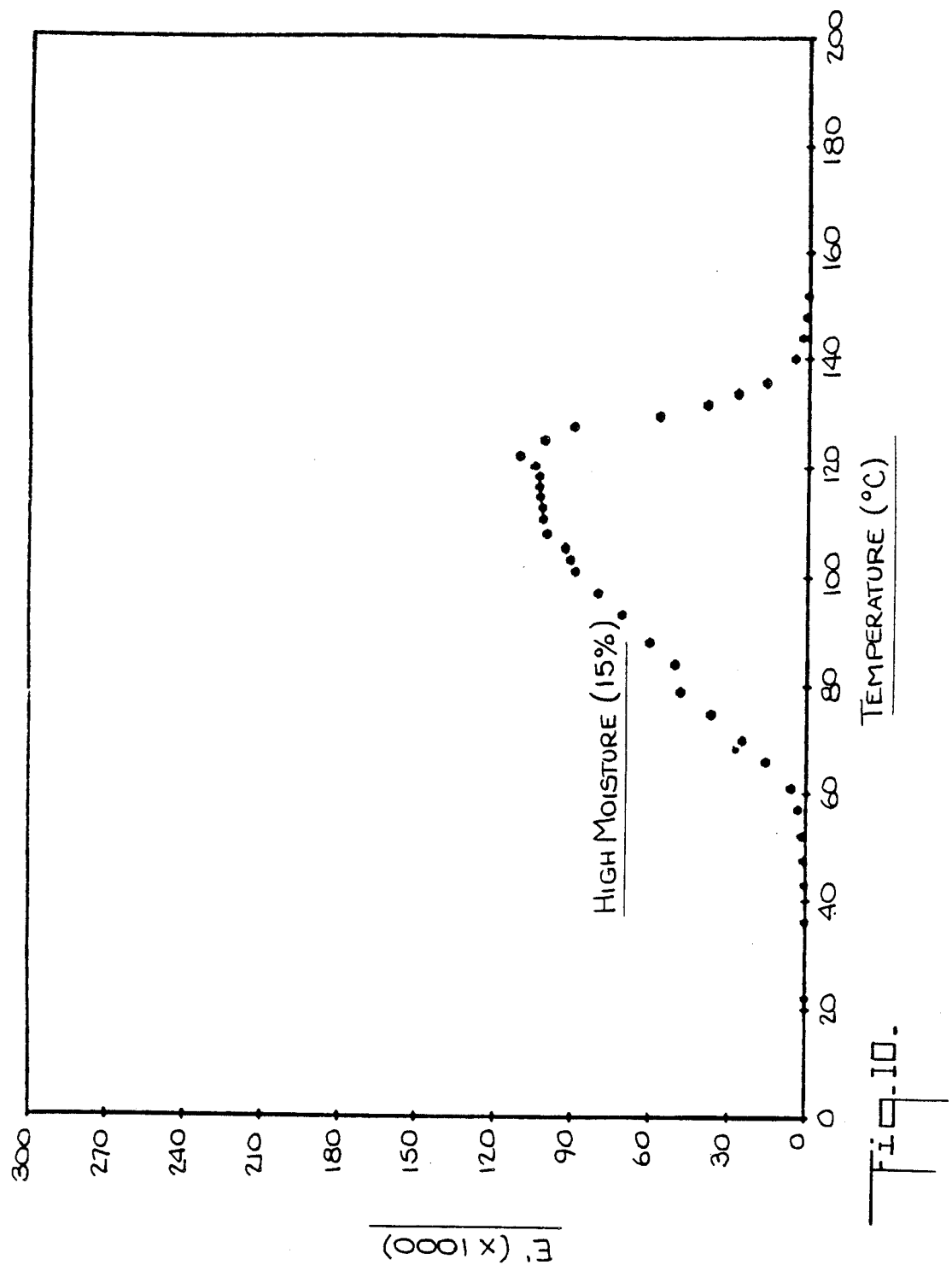
FIG. 10 illustrates the variation of the real component of the dielectric constant E' of solid bar soap with temperature as set in Example IV.

The variation of the real component of the dielectric constant E' of Cashmere Bouquet ® solid bar soap with temperature was determined in accordance with the method described in Example I. The values of the real component of the dielectric constant determined by the experiment are illustrated in FIG. 10.

Figure 11:
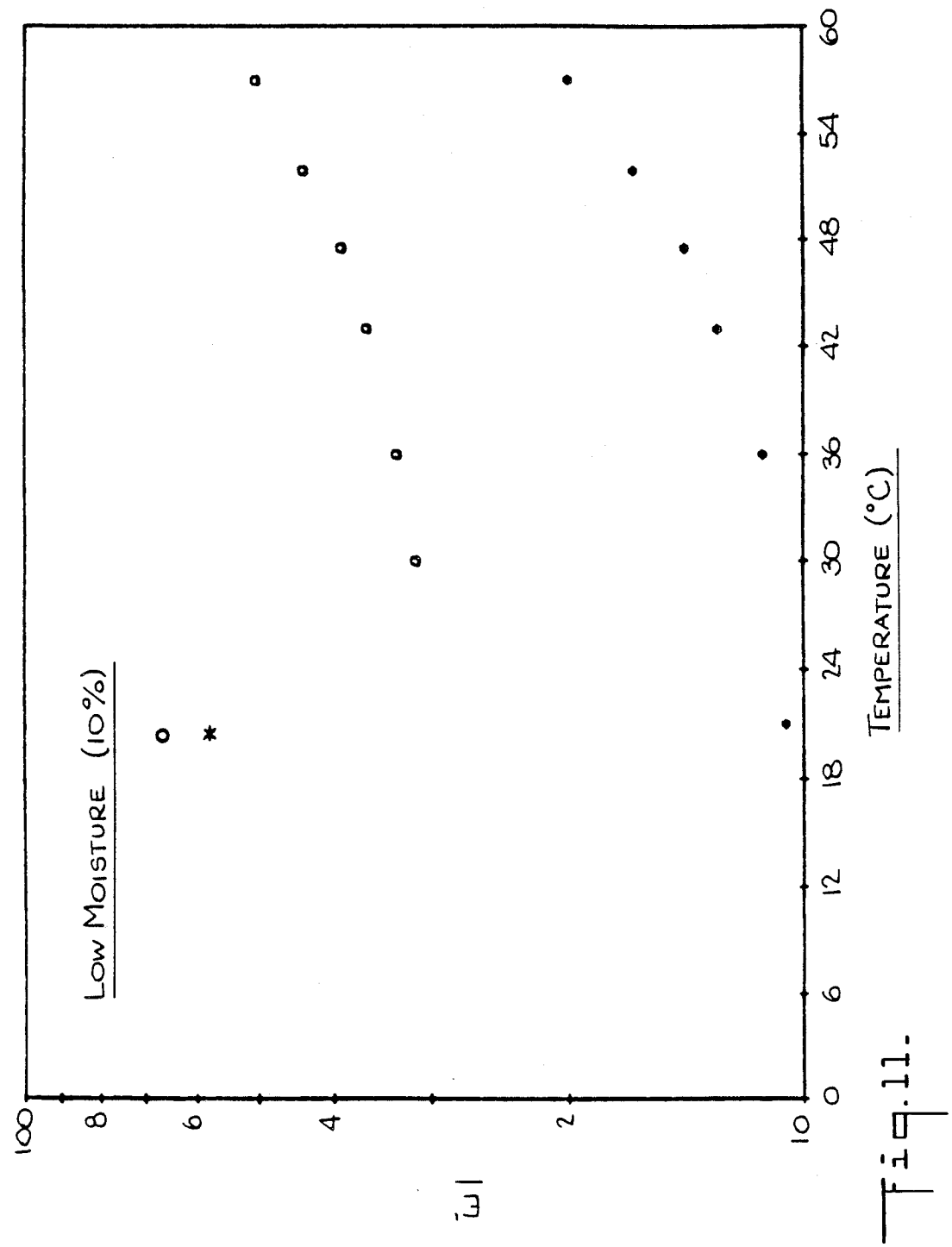
FIG. 11 illustrates the relative variation of the real component of the dielectric constant E' of 10% wt. water solid bar soaps with temperature as set forth in Examples I and II.
Figure 12:
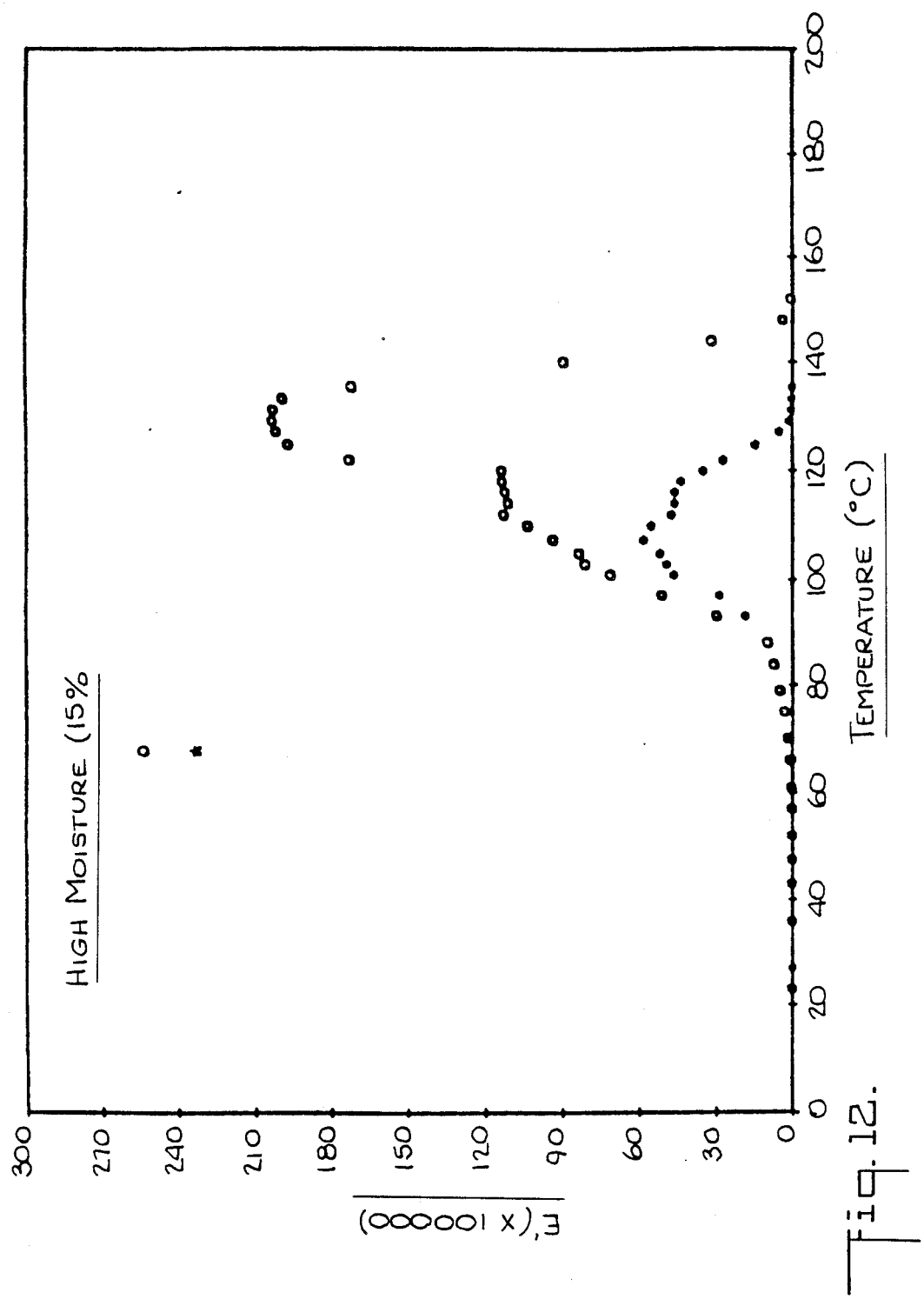
FIG. 12 illustrates the relative variation of the real component of the dielectric constant E' of 15% wt. water solid bar soap with temperature as set forth in Examples I and II.

FIGS. 11 and 12 illustrate the relative variation of the real component of the dielectric constants of 10% wt. water and 15% wt. water Irish Spring ® solid bar soap and Palmolive ® solid bar soap with temperature based upon the experiments described in Examples I-IV.

EXAMPLE V

Figure 15:
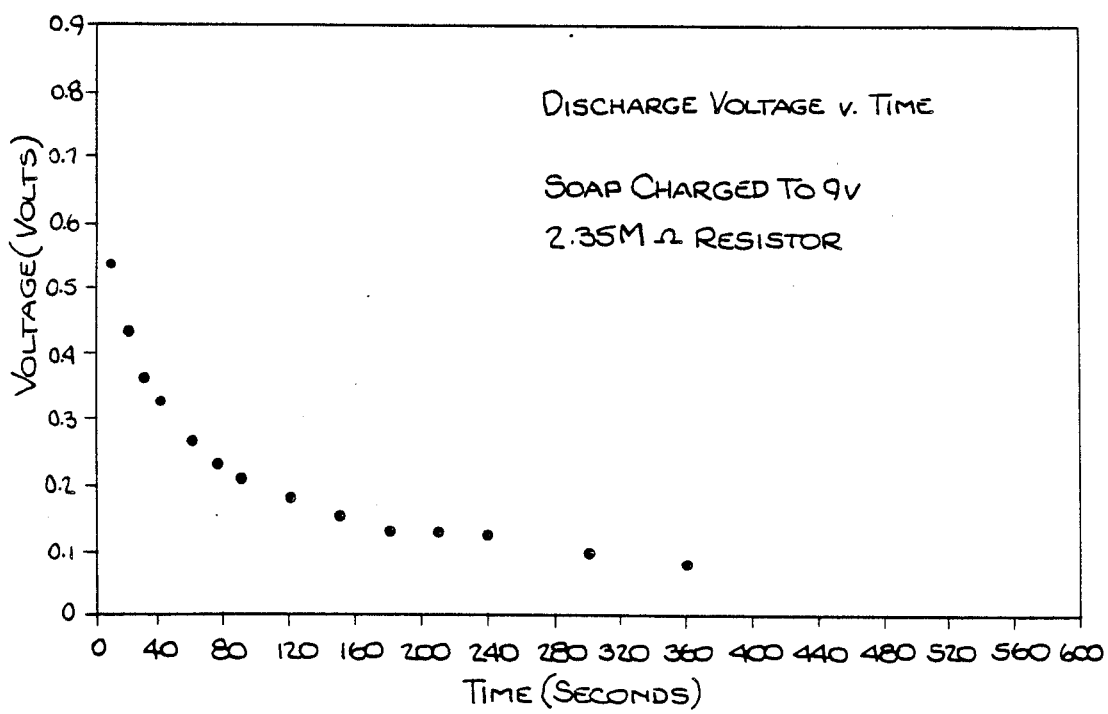
FIG. 15 illustrates the variation of the discharge voltage of the storage device described in Example V wherein a solid bar soap was employed as the dielectric.

Palmolive Gold ® solid bar soap was used as a dielectric in an electrical energy storage device made from single sided copper circuit board (2½ inch by 3¾ inch) with a ⅛ inch thickness of solid bar soap therebetween. Five such devices were connected in parallel and charged with 9 volts and their discharge measured through a 2.35 megaohm resistor. The resulting data is summarized in FIG. 15.

EXAMPLE VI

Figure 16:
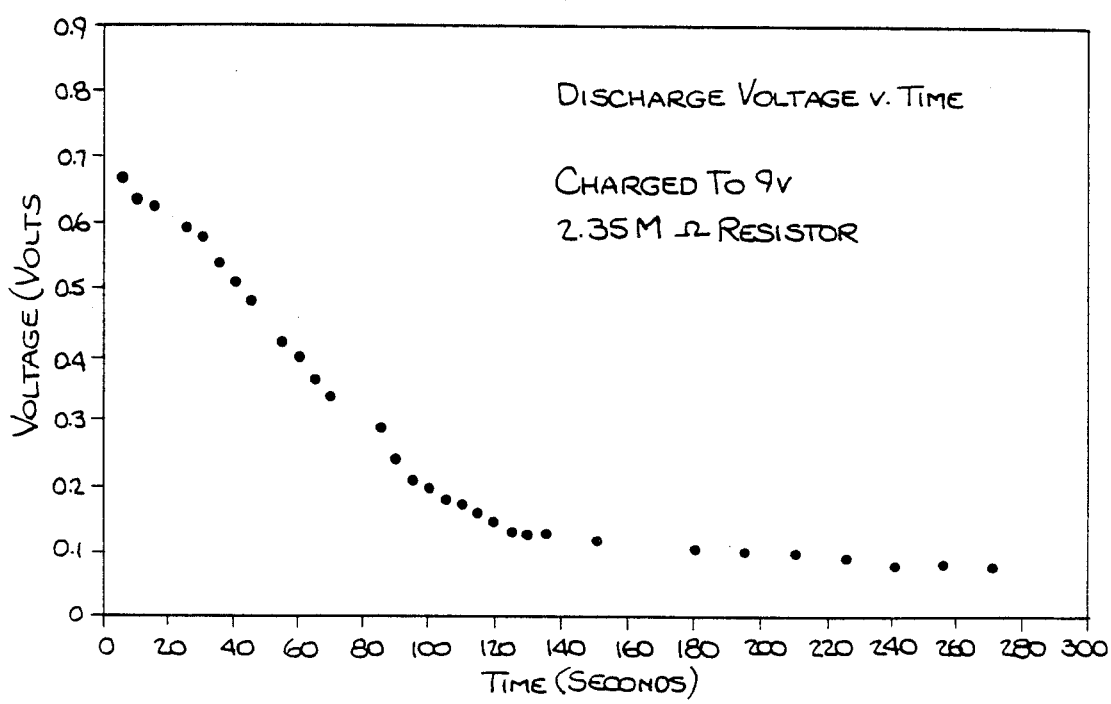
FIGS. 16 to 19 illustrate the variation of the voltage of the storage devices of Examples VI to IX employing solid bar soap A as the dielectric with time for various levels of charge and size of discharge loads.

Soap A solid bar soap was substituted as the dielectric in the storage device of Example V. The device was charged using a 9 volt power source for eight minutes and electrical discharge was measured through a 2.35 megaohm resistor. Discharge voltage as a function of time was recorded and is illustrated in FIG. 16.

EXAMPLE VII

Figure 17:
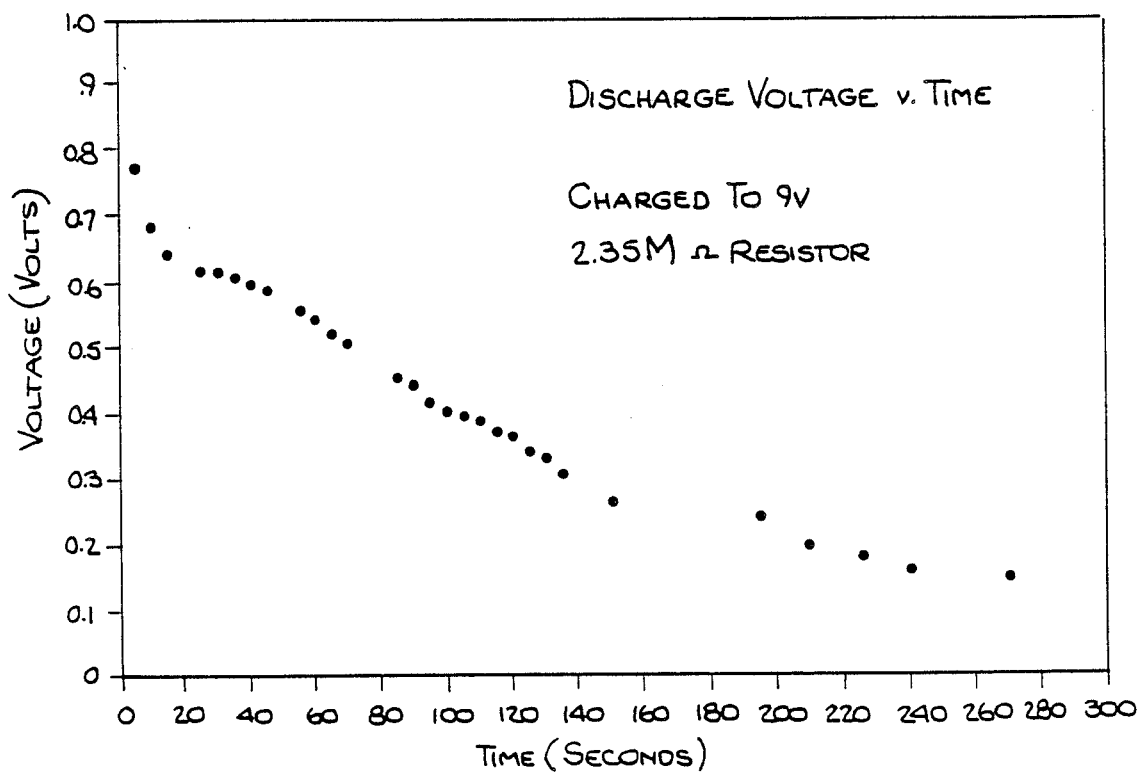

The storage device of Example VI was charged for 15 minutes to 9 volts at a temperature of 19° C. and subsequently discharged through a 2.35 megaohms resistor. The discharge voltage as a function of time was recorded and is illustrated in FIG. 17.

EXAMPLE VIII

Figure 18:
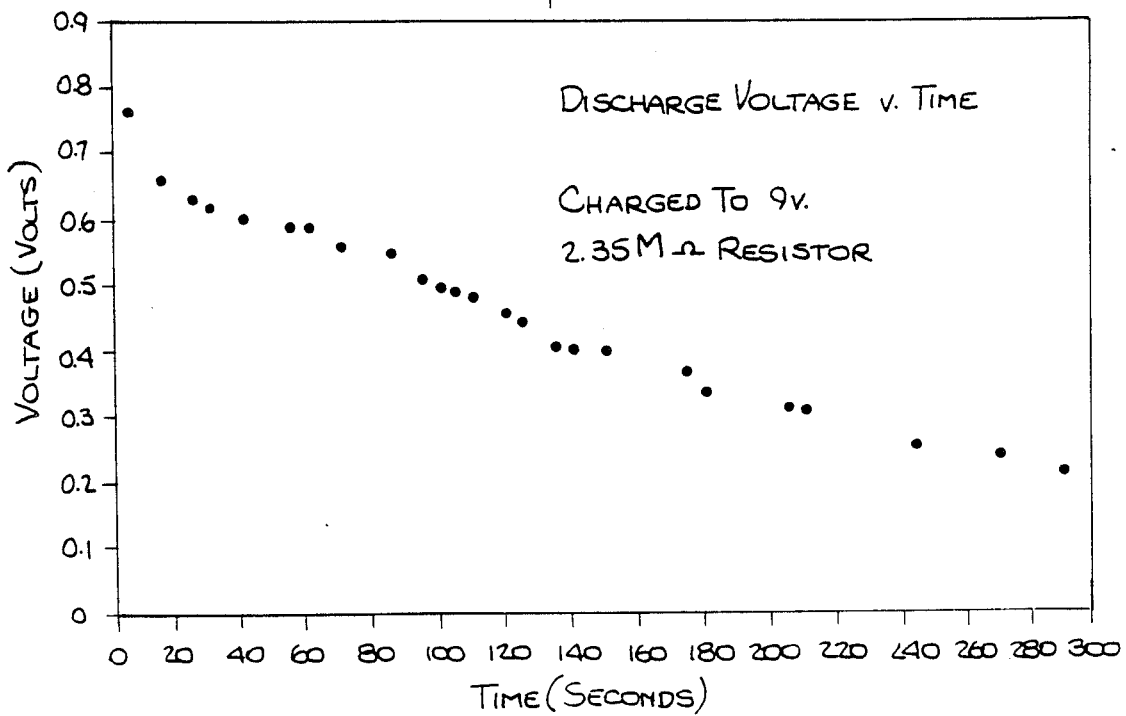

The storage device described in Example VI were charged to 9 volts for 31 minutes and then discharged through 2.35 megaohms resistor. The discharge voltage as a function of time was recorded and is illustrated in FIG. 18.

EXAMPLE IX

Figure 19:
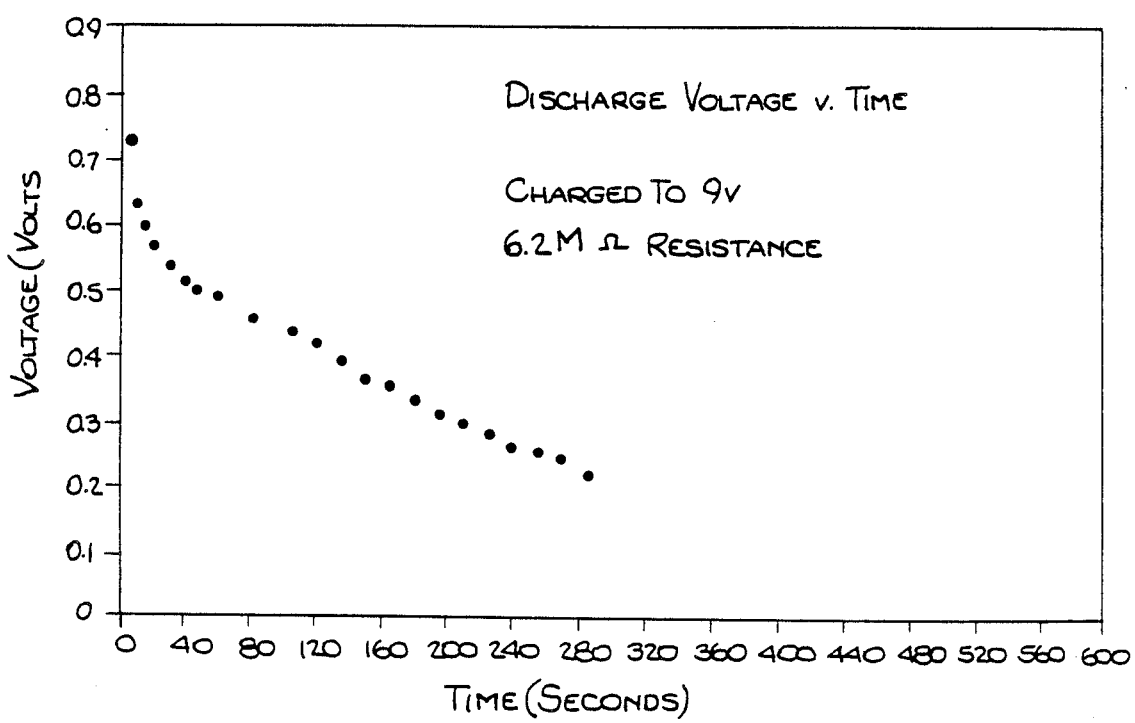

The storage device of Example VI was charged for 26 minutes to 9 volts. Soap A was employed as the dielectric. The device was then discharged through a resistance of 6.2 megaohms The discharge voltage as a function of time is illustrated in FIG. 19.

EXAMPLE X

Figure 20:
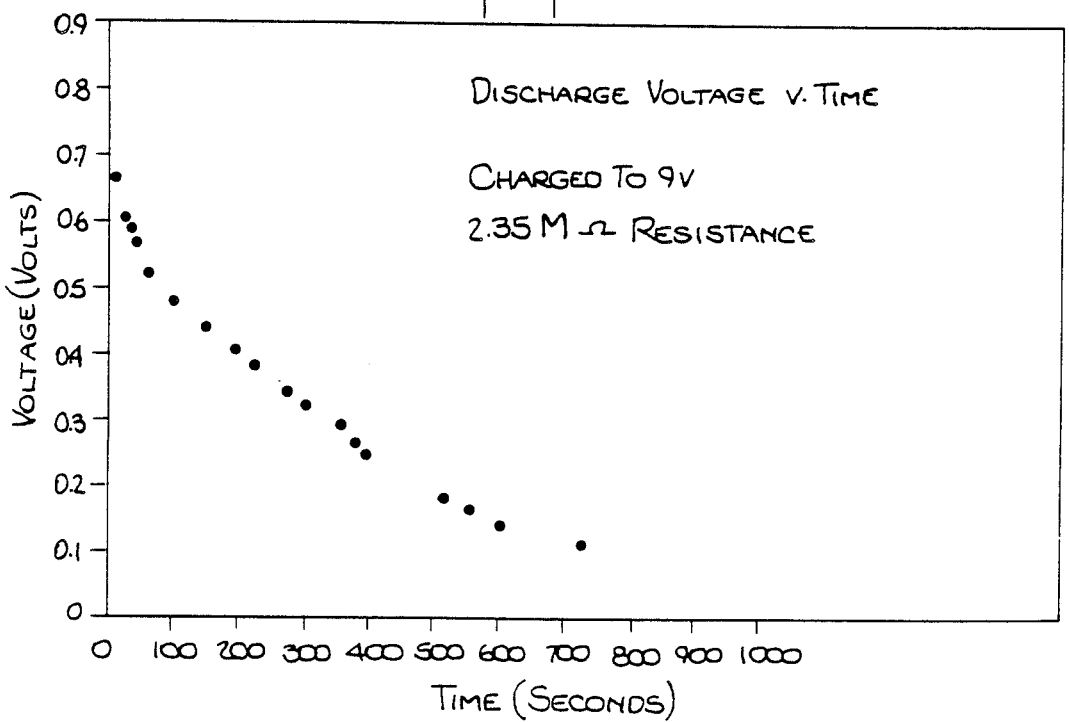
FIGS. 20–21 illustrate the variation of the voltage of the storage devices of Examples X and XI for various levels of charge and size of discharge loads.

Irish Spring ® solid bar soap was substituted as dielectric in the electric storage device described in Example V. The device was charged for 15 minutes to 9 volts at 22° C. and discharged through a 2.35 megaohm resistor. The discharge voltage as a function of time was recorded and is illustrated in FIG. 20.

EXAMPLE XI

Figure 21:
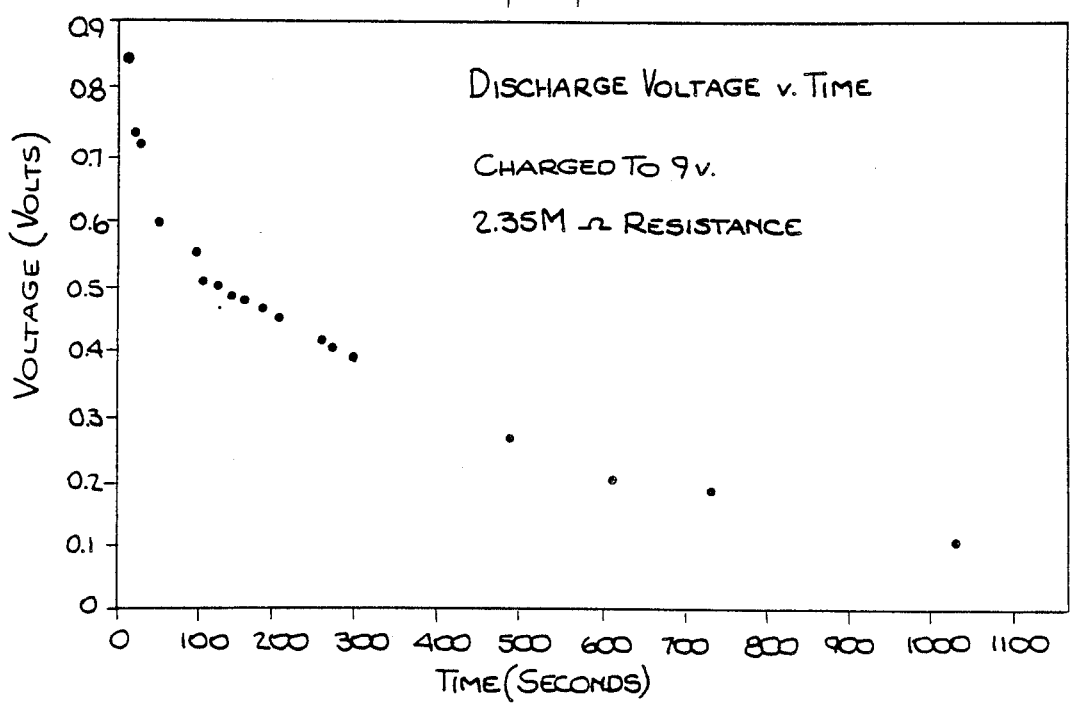

The storage device described in Example V was charged for a period of 30 minutes to 9 volts at 23° C. and then discharged through a 2.35 megaohm resistor. Irish Spring ® solid bar soap was used as the dielectric and the discharge voltage as a function of time was recorded and illustrated in FIG. 21.

EXAMPLE XII

Figure 13:
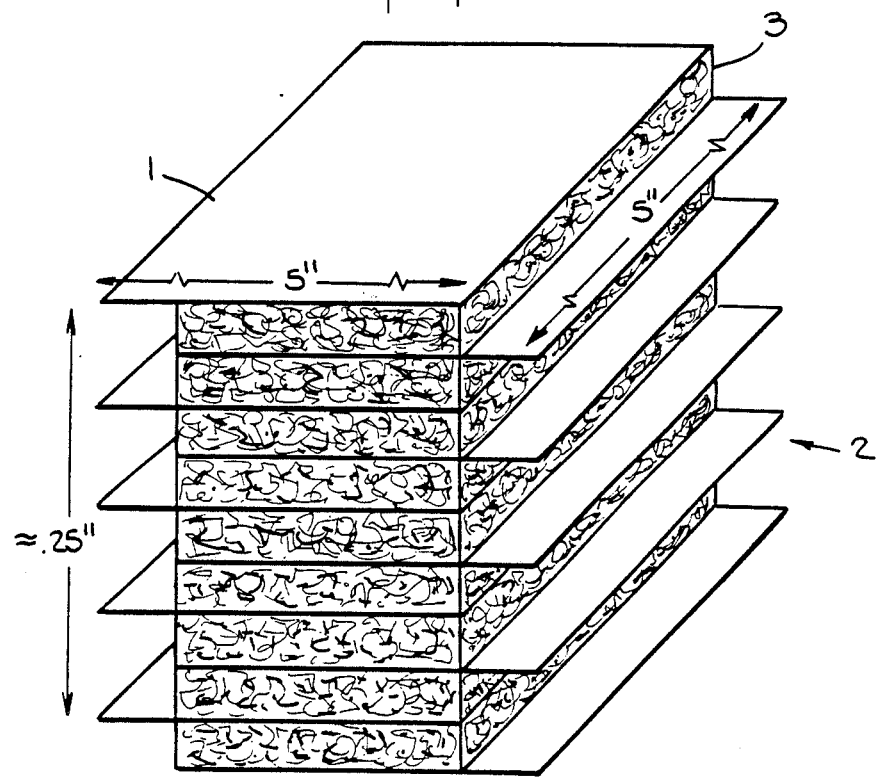
FIG. 13 is an illustration of an electrical storage device made in accordance with the present invention.

Individual capacitors were constructed from commercial metal foil 2 such as aluminum foil and sterile gauze fabric impregnated with neat soap 3, as shown in FIG. 13. The gauze employed provided both structural support for the neat soap and served to space the metal foil electrodes 2. The neat soap utilized in these capacitors was prepared from a blend of edible tallow and coconut oil, according to conventional batch methods. A tallow/coconut ratio of 75/25 (by weight) was employed. Each capacitor contained a total of 10 foil electrodes separated by 9 layers of gauze impregnated with neat soap. Each aluminum foil electrode had a surface area of 25 square inches. The carbon chain distribution of the neat soap used in these capacitors is shown in Table 1. The moisture content of the neat soap was determined to be 25%.

Four electrical devices of the type shown in FIG. 13 were constructed. Each capacitor was then wrapped and heat sealed in a moisture barrier polymer film to reduce moisture loss. Small perforations were made in the polymer film to facilitate necessary electrical connections to the capacitors. In view of the above-noted dependence of the electrical properties of the materials of this invention on moisture content means for preventing loss or gain of liquid from the materials during storage and use should be provided.

Figure 14:
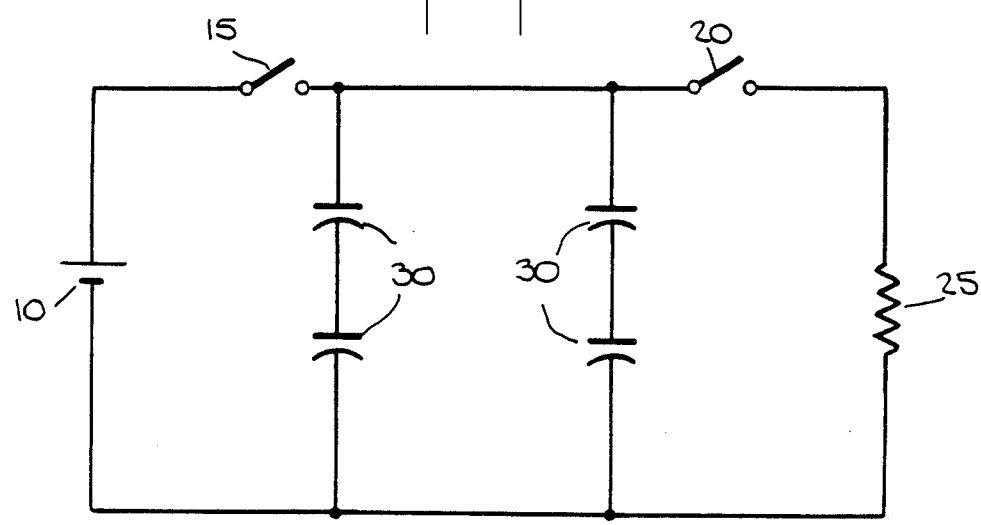
FIG. 14 is a schematic of the circuit used to measure the variation of the discharge voltage of the storage device of the present invention over time.

The capacitors were then configured in a circuit according to the schematic depicted in FIG. 14 and charged by a 9 volt d.c. voltage source by closing switch 15. Switch 15 was then opened and switch 20 closed to permit measurement of the discharge voltage of the storage devices 30 with a Bechman 360 digital voltmeter across resistance 25. The discharge voltage was measured as a function of time.

TABLE 1

| The carbon chain distribution of neat soap (75/25) utilized as a dielectric in the capacitor devices of Example XII. ||
|---|---|
| Carbon Chain Length | Distribution % |
| 8 | 2.0 |
| 10 | 1.8 |
| 12 | 13.4 |
| 14 | 7.2 |
| 14/1* | 0.6 |
| 15 | 0.5 |
| 15/1 | 0.1 |
| 16 | 12.5 |
| 15/1 | 2.7 |
| 17 | 1.0 |
| 17/1 | 0.6 |
| 18 | 15.3 |
| 18/1 | 31.7 |
| 19 | 1.1 |
| 18/2 | 2.6 |
| 20 | 0.3 |
| 18/3 | 0.7 |

*indicates the number of unsaturated bonds in the aliphatic moiety.

TABLE 2

| Capacitor Composition ||||| 
|---|---|---|---|---|
| Details of construction of the capacitor of Example XII. |||||
| Foil | 7.5 grams | 7.3 grams | 7.7 grams | 7.4 grams |
| Gauze | 6.9 grams | 6.7 grams | 6.8 grams | 6.8 grams |
| Soap | 96.7 grams | 88.9 grams | 89.3 grams | 79.4 grams |
| Total | 111.1 grams | 112.9 grams | 103.8 grams | 93.6 grams |

EXAMPLE XIII

The storage device described in Example XII was charged to 9 volts for a period of 43 minutes. The device was then connected to a d.c. motor which ran for a total of 8 minutes. During the discharge of the device, the motor initially spun rapidly for two to three minutes with no apparent loss of speed and thereafter noticeably slowed.

Approximately 58 minutes later, the device was reconnected to the 9 volt power source and was recharged for a period of 7 minutes. The storage device was then connected to the d.c. motor and allowed to discharge. The d.c. motor, which was connected to a paper pin wheel and ran for approximately 7 minutes and 55 seconds. The storage device was once again recharged to 9 volts for a period of 9 minutes and reconnected to the motor. The storage device powered the motor for 13 minutes. This procedure was repeated for a charge period of 11 minutes. The storage device powered the motor for approximately 5 minutes.

The storage device described in Example XII was charged for a period of 10 minutes to 8.68 volts. The device was then discharged through a motor which had a resistance of 20.8 ohms. Subsequent to the discharge, the device was left in a quiescent state whereupon it displayed a hysteresis effect of recharging from about 0.2V to about 1.2V in a few minutes. This hysteresis effect indicates that the storage device of the present invention exhibits a recharging capability such as that possessed by batteries.

Figure 22:
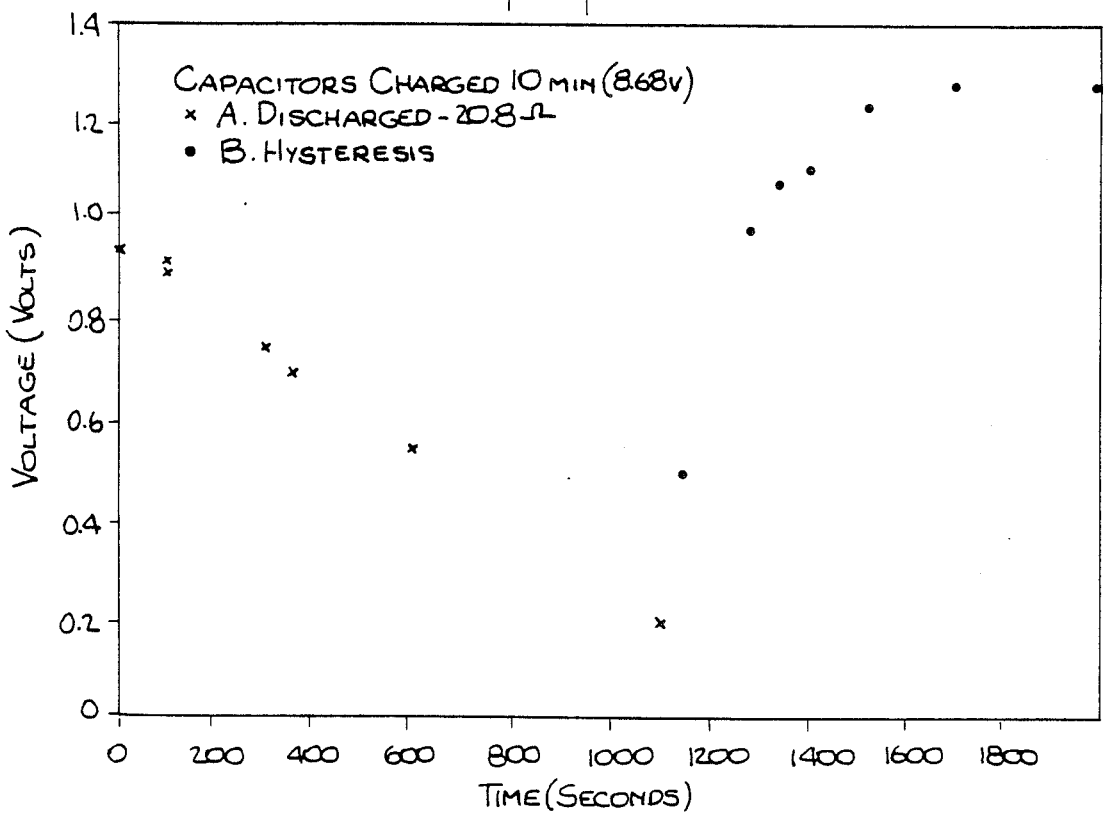
FIG. 22 illustrates the variation of the voltage of the storage device of FIG. 13 as forth in Example XII.

FIG. 22 illustrates the discharge and hysteresis effect as a function of time.

While the present invention has been particularly described in terms of specific embodiments thereof, it will be understood in view of the present disclosure, that numerous variations upon the invention are now enabled to those skilled in the art, which variations yet reside within the scope of the present invention. Accordingly, the invention is to be broadly construed, and limited only by the scope and spirit of the claims now appended hereto.

What is claimed is:

1. A composition comprising a polarized high capacitance dielectric material formed of an amphipathic compound principally and a liquid, said liquid being provided in amounts effective to produce a liquid crystal microstructure.

2. The composition according to claim 1, wherein the liquid crystal microstructure is a neat soap microstructure.

3. The composition according to claim 1, wherein the liquid crystal microstructure is a smectic lamellar microstructure.

4. The composition according to claim 1, wherein the liquid microstructure is a micelle microstructure.

5. The composition according to claims 1, 2, 3 or 4, wherein the liquid further includes a minor amount of an electrolyte.

6. The composition according to claim 5, wherein the electrolyte is selected from the group consisting of sodium chloride and potassium chloride.

7. The composition according to claim 6, wherein the salt of a fatty acid is selected from the group consisting of alkalaine metal, alkalaine earth metal, ammonium and alkanol-ammonium salts; and the liquid is water.

8. The composition according to claim 5, wherein the electrolyte is an ionic salt.

9. The composition according to claim 5, wherein the amphipathic compound is a salt of a fatty acid and the liquid is a polar liquid.

10. The composition according to claim 9, wherein the salt of a fatty acid is selected from the group consisting of alkali metal, alkaline earth metal, ammonium and alkanol-ammonium salts.

11. The composition according to claim 5, wherein the amphipathic compound is a salt of a fatty acid and the liquid is water.

12. The composition according to claim 11 wherein the salt of a fatty acid is a sodium salt having about 12 to about 18 carbon atoms.

13. An electrical storage device comprising:
   (a) a means of providing an electric field;
   (b) a plurality of parallel plate electrodes connected to the means for providing the electric field; and
   (c) a polarizable high capacitance dielectric material disposed between said electrodes, said material being composed of an amphipathic compound principally and a liquid, said liquid being provided in amounts effective to produce a liquid crystal microstructure.

14. The electrical storage device of claim 13, further comprising means for preventing loss or gain of liquid during use and storage of the device.

15. The electrical storage device of claim 14, wherein the polarizable material is impregnated in gauze.

16. The electrical storage device of claim 14, wherein said amphipathic compound is a salt of a fatty acid or mixture thereof and said liquid is water.

17. The electrical storage device of claim 16 wherein the device is a capacitor.

18. The electrical storage device of claim 16 wherein the device is a battery.

19. The electrical storage device of claim 13 wherein said device is a capacitor.

20. An electrical device comprising:
polarizable high capacitance dielectric material formed of an amphipathic compound principally and a liquid provided in amounts effective to produce a liquid crystal microstructure; and
electrical transmission means connected to said material for the transmission of
electrical signals.

21. The electrical device according to claim 20, wherein the liquid crystal microstructure is a neat soap microstructure.

22. The electrical device according to claim 20 wherein the liquid crystal microstructure is a bar phase microstructure.

23. The electrical device according to claim 20, wherein the liquid crystal microstructure is a smectic lamellar microstructure.

24. The electrical device according to claim 20, wherein the liquid crystal microstructure is a micelle microstructure.

25. The electrical device according to claim 20, 21, 22, 23 or 24, wherein the liquid further includes a minor amount of an electrolyte.

26. The electrical device according to claim 25, wherein the electrolyte is selected from the group consisting of sodium chloride and potassium chloride.

27. The electrical device according to claim 25, wherein the electrolyte is an ionic salt.

28. The electrical device according to claim 25, wherein the amphipathic compound is a salt of a fatty acid and the liquid is water.

29. The electrical device according to claim 28, wherein the salt of a fatty acid is selected from the group consisting of alkali metal, alkaline earth metal, ammonium and alkanol-ammonium salts.

30. The electrical device according to claim 25, further comprising means for preventing loss or gain of liquid during storage and use.

31. The electrical device according to claim 20, wherein the amphipathic compound is a salt of a fatty acid and the liquid is a polar liquid.

32. The electrical device according to claim 31, wherein the salt of a fatty acid is selected from the group consisting of a alkalai metal, alkaline earth metal, ammonium and alkanol-ammonium salts; and the liquid is water.

33. The electrical device according to claim 31, wherein the salt of a fatty acid is a sodium salt and predominantly about 12 to about 18 carbon atoms.

34. The electrical device according to claim 1, wherein the polarizable material is capable of being repetitively and sequentially charged and discharged.

35. A battery comprising:
a polarized material formed of an amphiphatic compound principally and a liquid provided in amounts effective to produce a liquid crystal microstructure for said material; and
electrical transmission means connected to said material for the transmission of electrical signals.

36. The battery of claim 35 wherein said amphiphatic compound is a salt of fatty acid or a mixture thereof and a polar liquid.

37. The battery of claim 36 wherein said polar liquid is water.

38. An electrical device responsive to temperature variations comprising:
a polarized high capacitance material formed from dielectric an amphipathic compound principally and a liquid provided in amounts effective to produce a liquid crystal microstructure, said polarized material having a dielectric constant dependent on temperature; and
electrical connection means for transmitting electrical signals to said polarized materials.

39. The electrical device of claim 38 wherein said amphipathic compound is soap and said liquid is water.

40. The electrical device of claim 38 wherein said compound is a superfatted solid bar of soap with a water content of 10-15% by weight.

41. An electrical device characterized by a polarizable material having a liquid crystal microstructure comprising of an amphipathic compound principally and a liquid, said liquid including a minor amount of an electrolyte selected from the group consisting of sodium chloride and potassium chloride; and electrical transmission means connected thereto.

42. An composition comprising a shape-retaining polarized high capacitance dielectric material having a liquid crystal microstructure comprised of an amphipathic compound principally and a liquid, said liquid including a minor amount of an electrolyte selected from the group consisting of sodium chloride and potassium chloride.

43. In a capacitor having a pair of electrodes and a dielectric material therebetween.
the improvement wherein said dielectric material consists essentially of
a shape-retaining mixture of an amphipathic compound principally and a liquid, adapted to provide a high capacitance.

44. The capacitor of claim 43 wherein said amphipathic compound is soap and said liquid is water.

45. The capacitor of claim 44 in which said soap is a neat phase soap.

46. The capacitor of claim 45 in which said soap comprises 60-85% tallow and 40-15% coconut oil neutralized with sodium hydroxide.

47. A capacitor comprising:
at least one pair of electrodes, and between said electrodes a dielectric material comprising an amphipathic compound principally and a liquid, in the form of a liquid crystal microstructure to provide a high capacitance dielectric material.

48. The capacitor of claim 47 wherein said amphipathic compound is selected from the group consisting of alkali metal, alkaline earth metal, ammonium and alkanol-ammonium salts of $C_{16}$–$C_{18}$ fatty acids, and said liquid is water.

49. The capacitor of claim 48 wherein said fatty acid contains an even number of carbon atoms between 12–18.

50. The capacitor of claim 47 wherein said amphipathic compound and said liquid comprise a neat phase soap.

51. The capacitor of claim 50 wherein said dielectric contains 20–25% water by weight.

52. The capacitor of claim 51 wherein said amphipathic compound contains about 60–85% tallow and 40–15% coconut oil neutralized with sodium hydroxide.

53. The capacitor of claim 52 wherein said amphipathic compound is a 75/25 mixture of tallow and coconut oil neutralized with sodium hydroxide.

54. The capacitor of claim 52 wherein said amphipathic compound is a 60/40 mixture of tallow and coconut oil neutralized with sodium hydroxide.

55. The capacitor of claim 51 wherein said amphipathic compound is a 85/15 mixture of tallow and coconut oil neutralized with sodium hydroxide.

56. The capacitor of claim 47 wherein said liquid contains a minor amount of an electrolyte.

* * * * *